(12) United States Patent
Kakura et al.

(10) Patent No.: US 8,428,157 B2
(45) Date of Patent: Apr. 23, 2013

(54) METHOD AND APPARATUS FOR REFERENCE SIGNAL GENERATION IN WIRELESS COMMUNICATION SYSTEM

(75) Inventors: Yoshikazu Kakura, Tokyo (JP); Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 1466 days.

(21) Appl. No.: 12/024,062

(22) Filed: Jan. 31, 2008

(65) Prior Publication Data

US 2008/0253484 A1 Oct. 16, 2008

(30) Foreign Application Priority Data

Feb. 5, 2007 (JP) ................................. 2007-026150

(51) Int. Cl.
*H04L 27/06* (2006.01)
(52) U.S. Cl.
USPC ............................ 375/260; 375/343; 370/203
(58) Field of Classification Search .................. 375/260, 375/343; 370/203, 343, 208, 470, 500; 455/509
See application file for complete search history.

(56) References Cited

U.S. PATENT DOCUMENTS

| 2005/0226140 | A1 | 10/2005 | Zhuang et al. | |
| 2006/0050799 | A1* | 3/2006 | Hou et al. | 375/260 |
| 2006/0056528 | A1* | 3/2006 | Jung et al. | 375/260 |
| 2007/0171995 | A1* | 7/2007 | Muharemovic et al. | 375/260 |
| 2007/0177682 | A1* | 8/2007 | Han et al. | 375/260 |
| 2007/0253465 | A1* | 11/2007 | Muharemovic et al. | 375/130 |
| 2008/0318528 | A1* | 12/2008 | Hooli et al. | 455/62 |
| 2009/0080500 | A1* | 3/2009 | Muharemovic et al. | 375/146 |
| 2010/0034165 | A1* | 2/2010 | Han et al. | 370/330 |
| 2010/0210274 | A1* | 8/2010 | Iwai et al. | 455/450 |

FOREIGN PATENT DOCUMENTS

WO WO 2007091590 A1 8/2007

OTHER PUBLICATIONS

3GPP TSG RAN WG1 Meeting #45, "Considerations on uplink pilot design using CAZAC sequences", Shanghai, China, May 8-12, 2006, R1-061311, pp. 1-5.
3GPP TSG RAN WG1 Meeting #48, "Criteria to decide Zadoff-Chu sequence length for EUTRA uplink reference signal", St. Louis, U.S., Feb. 12-16, 2007, R1-070877, pp. 1-4.
Notice of Grounds for Rejection issued Nov. 2, 2011 by the Japanese Patent Office in counterpart Japanese Patent Application No. 2007-026150.
3GPP TR 25.814 v2.0.0, Jun. 2006.
3GPP R1-063369 Nokia, "CAZAC Sequence Length for E-UTRA UL," Nov. 6-10, 2006.

* cited by examiner

*Primary Examiner* — Aristocratis Fotakis
(74) *Attorney, Agent, or Firm* — Sughrue Mion, PLLC

(57) ABSTRACT

To provide a reference signal generation method and apparatus capable of obtaining many reference signal sequences having excellent properties. CAZAC sequences that satisfy the condition that the absolute value ($|N-L|$) of a difference between a sub-carrier number N in a resource block and a CAZAC sequence length L is not larger than a threshold value K are selected, and a sequence having a largest among greatest prime factors among the prime factors constituting the sequence length(s) is further selected from the initially selected sequences. Then, a reference signal sequence(s) is generated from a selected CAZAC sequence.

16 Claims, 17 Drawing Sheets

SELECT CAZAC SEQUENCES SO THAT ABSOLUTE VALUE $|N-L|$ OF DIFFERENCE BETWEEN SUB-CARRIER NUMBER N IN RESOURCE BLOCK AND CAZAC SEQUENCE LENGTH L IS NOT LARGER THAN THRESHOLD VALUE K — S20

SELECT CAZAC SEQUENCE HAVING A LARGEST OF GREATEST PRIME FACTOR Li AMONG PRIME FACTORS CONSTITUTING SEQUENCE LENGTHS — S21

GENERATE REFERENCE SIGNAL SEQUENCE(S) FROM SELECTED CAZAC SEQUENCE — S22

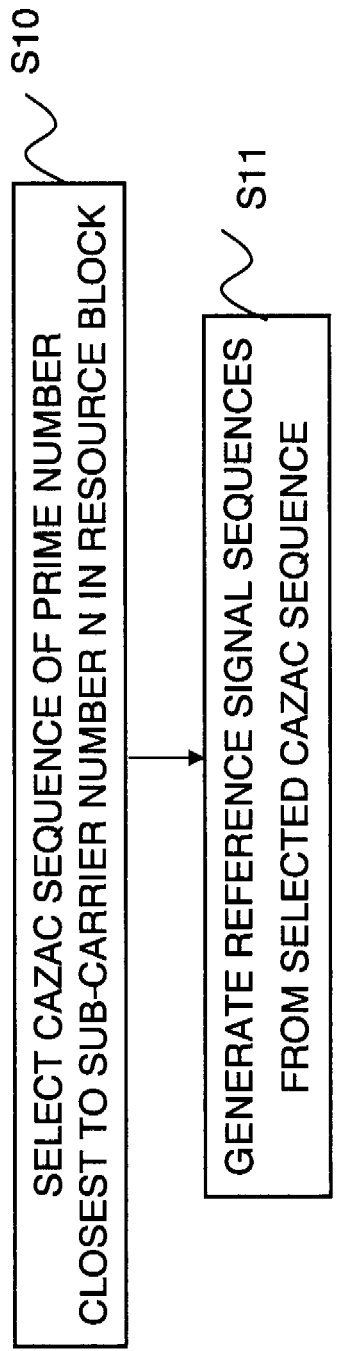

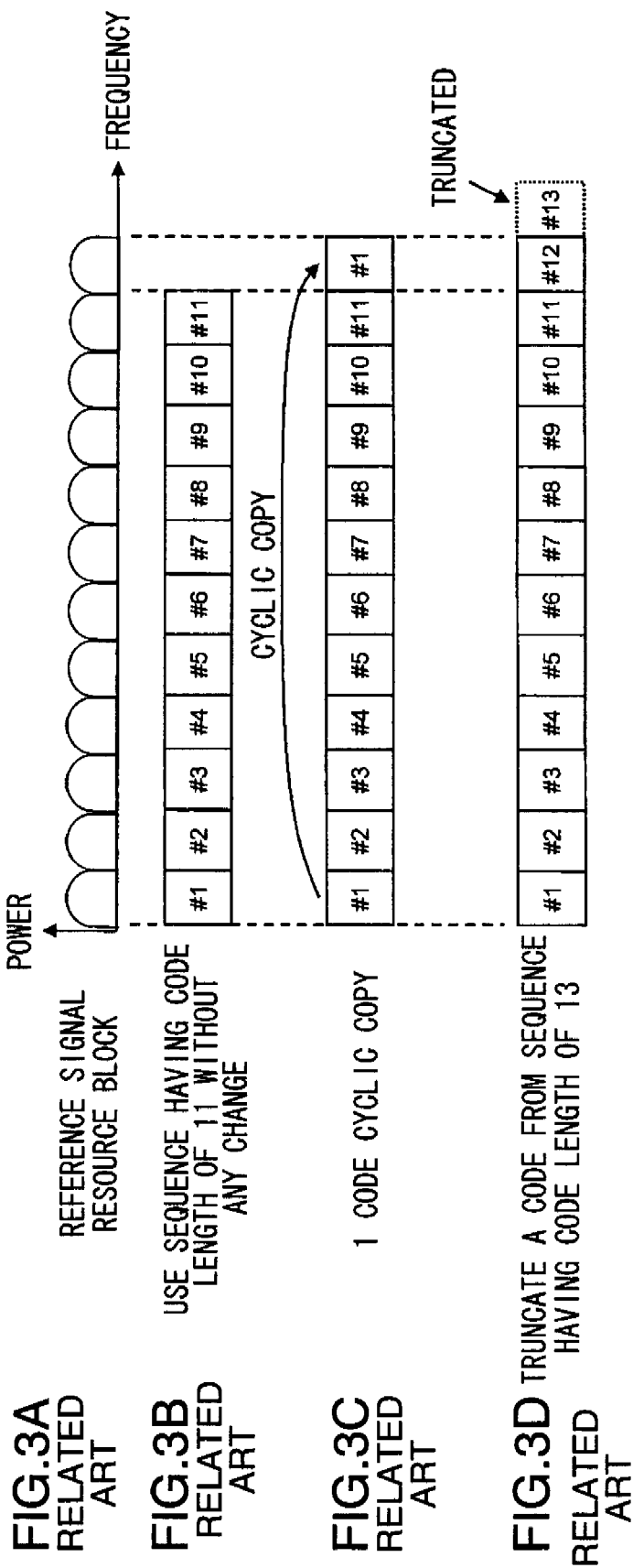

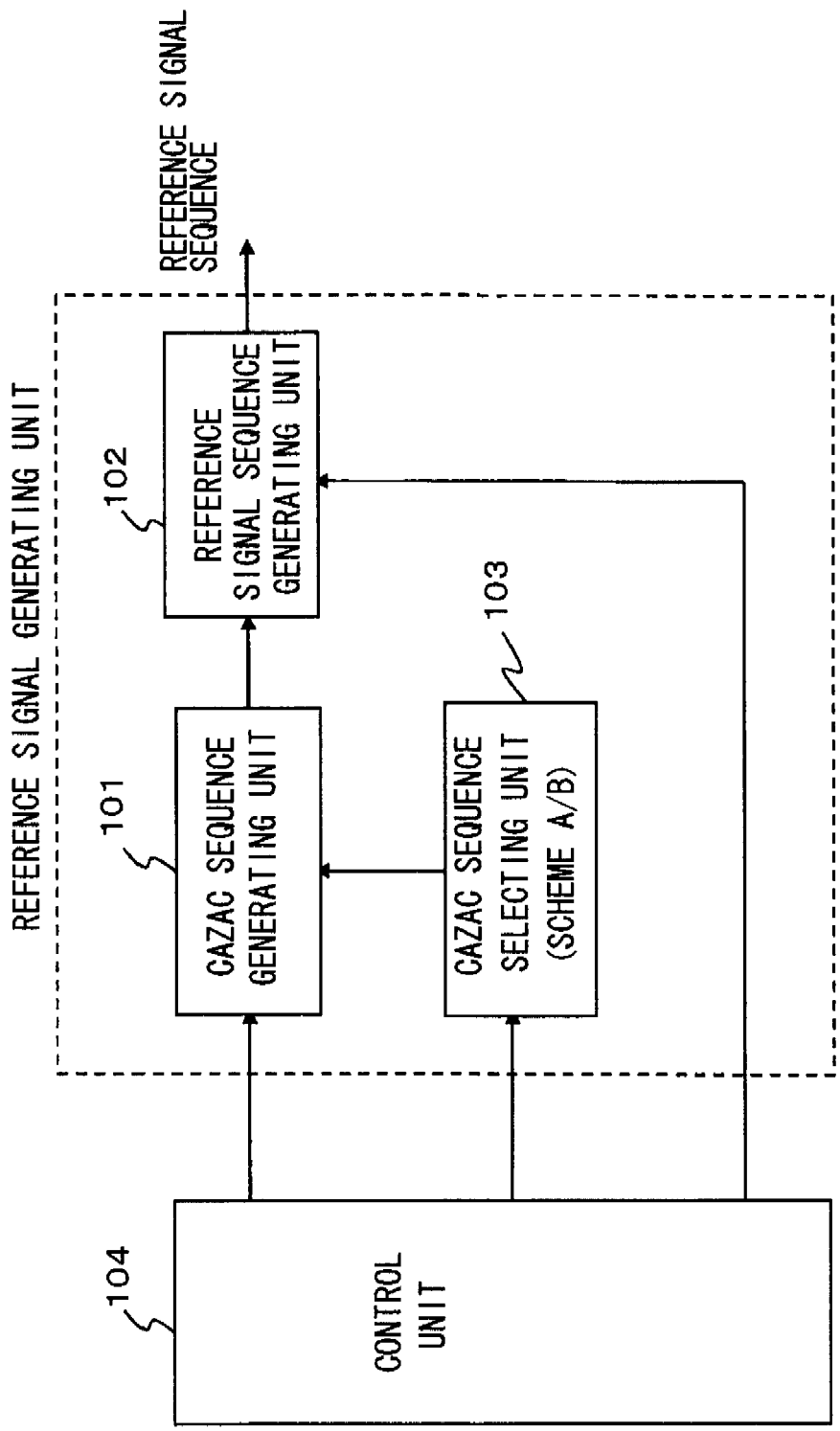

FIG.6

| RESOURCE BLOCK NUMBER | SUB-CARRIER NUMBER N | PRIME NUMBER SMALLER THAN SUB-CARRIER NUMBER N AND CLOSEST TO N | PRIME NUMBER NOT SMALLER THAN SUB-CARRIER NUMBER N AND CLOSEST TO N | CAZAC SEQUENCE LENGTH GENERATED BY MODE 1 |
|---|---|---|---|---|
| 1 | 12 | 11 | 13 | 13 |
| 2 | 24 | 23 | 29 | 23 |
| 3 | 36 | 31 | 37 | 37 |
| 4 | 48 | 47 | 53 | 47 |
| 5 | 60 | 59 | 61 | 61 |
| 6 | 72 | 71 | 73 | 73 |
| 7 | 84 | 83 | 89 | 83 |
| 8 | 96 | 89 | 97 | 97 |
| 9 | 108 | 107 | 109 | 109 |
| 10 | 120 | 113 | 127 | 122(=61x2) |
| 11 | 132 | 131 | 137 | 131 |
| 12 | 144 | 139 | 149 | 146(=73x2) |
| ... | ... | ... | ... | ... |
| 17 | 204 | 199 | 211 | 206(=103x2) |
| 18 | 216 | 211 | 223 | 218(=109x2) |
| ... | ... | ... | ... | ... |
| 25 | 300 | 293 | 307 | 298(=149x2) |
| 26 | 312 | 311 | 313 | 313 |
| 27 | 324 | 317 | 331 | 326(=163x2) |
| ... | ... | ... | ... | ... |
| 43 | 516 | 509 | 523 | 514(=257x2) |
| 44 | 528 | 523 | 541 | 526(=263x2) |
| 45 | 540 | 523 | 541 | 541 |
| 46 | 552 | 547 | 557 | 554(=277x2) |
| 47 | 564 | 563 | 569 | 563 |
| 48 | 576 | 571 | 577 | 577 |
| 49 | 588 | 587 | 593 | 587 |
| 50 | 600 | 599 | 601 | 601 |

FIG.8

| RESOURCE BLOCK NUMBER | SUB-CARRIER NUMBER N | PRIME NUMBER SMALLER THAN SUB-CARRIER NUMBER N AND CLOSEST TO N | PRIME NUMBER NOT SMALLER THAN SUB-CARRIER NUMBER N AND CLOSEST TO N | CAZAC SEQUENCE LENGTH GENERATED BY MODE 2 |
|---|---|---|---|---|
| 1 | 12 | 11 | 13 | 11 |
| 2 | 24 | 23 | 29 | 23 |
| 3 | 36 | 31 | 37 | 37 |
| 4 | 48 | 47 | 53 | 47 |
| 5 | 60 | 59 | 61 | 59 |
| 6 | 72 | 71 | 73 | 71 |
| 7 | 84 | 83 | 89 | 83 |
| 8 | 96 | 89 | 97 | 97 |
| 9 | 108 | 107 | 109 | 107 |
| 10 | 120 | 113 | 127 | 118(=59x2) |
| 11 | 132 | 131 | 137 | 131 |
| 12 | 144 | 139 | 149 | 142(=71x2) |
| ... | ... | ... | ... | ... |
| 17 | 204 | 199 | 211 | 202(=101x2) |
| 18 | 216 | 211 | 223 | 214(=107x2) |
| ... | ... | ... | ... | ... |
| 25 | 300 | 293 | 307 | 298(=149x2) |
| 26 | 312 | 311 | 313 | 311 |
| 27 | 324 | 317 | 331 | 323(=19x17) |
| ... | ... | ... | ... | ... |
| 43 | 516 | 509 | 523 | 514(=257x2) |
| 44 | 528 | 523 | 541 | 526(=263x2) |
| 45 | 540 | 523 | 541 | 541 |
| 46 | 552 | 547 | 557 | 551(=29x19) |
| 47 | 564 | 563 | 569 | 563 |
| 48 | 576 | 571 | 577 | 577 |
| 49 | 588 | 587 | 593 | 587 |
| 50 | 600 | 599 | 601 | 599 |

FIG.10

| RESOURCE BLOCK NUMBER | SUB-CARRIER NUMBER N | PRIME NUMBER SMALLER THAN SUB-CARRIER NUMBER N AND CLOSEST TO N | PRIME NUMBER NOT SMALLER THAN SUB-CARRIER NUMBER N AND CLOSEST TO N | CAZAC SEQUENCE LENGTH GENERATED BY MODE 3 (THE GREATEST PRIME FACTOR 13 OR GREATER) |
|---|---|---|---|---|
| 1 | 12 | 11 | 13 | 13 |
| 2 | 24 | 23 | 29 | 23 |
| 3 | 36 | 31 | 37 | 37 |
| 4 | 48 | 47 | 53 | 47 |
| 5 | 60 | 59 | 61 | 59 or 61 |
| 6 | 72 | 71 | 73 | 71 or 73 |
| 7 | 84 | 83 | 89 | 83 |
| 8 | 96 | 89 | 97 | 97 |
| 9 | 108 | 107 | 109 | 107 or 109 |
| 10 | 120 | 113 | 127 | 119(=17x7) |
| 11 | 132 | 131 | 137 | 131 |
| 12 | 144 | 139 | 149 | 143(=13x11) or 145(=29x5) |
| ... | ... | ... | ... | ... |
| 17 | 204 | 199 | 211 | 204(=17x3x2$^2$) |
| 18 | 216 | 211 | 223 | 215(=43x5) or 217(=31x7) |
| ... | ... | ... | ... | ... |
| 25 | 300 | 293 | 307 | 299(=23x13) or 301(=43x7) |
| 26 | 312 | 311 | 313 | 311 or 313 |
| 27 | 324 | 317 | 331 | 323(=19x17) or 325(=13x5$^2$) |
| ... | ... | ... | ... | ... |
| 43 | 516 | 509 | 523 | 516(=43x4x3) |
| 44 | 528 | 523 | 541 | 527(=31x17) or 529(=23x23) |
| 45 | 540 | 523 | 541 | 541 |
| 46 | 552 | 547 | 557 | 552(=23x3x2$^3$) |
| 47 | 564 | 563 | 569 | 563 |
| 48 | 576 | 571 | 577 | 577 |
| 49 | 588 | 587 | 593 | 587 |
| 50 | 600 | 599 | 601 | 599 or 601 |

FIG.12

| RESOURCE BLOCK NUMBER | SUB-CARRIER NUMBER N | PRIME NUMBER SMALLER THAN SUB-CARRIER NUMBER N AND CLOSEST TO N | PRIME NUMBER NOT SMALLER THAN SUB-CARRIER NUMBER N AND CLOSEST TO N | CAZAC SEQUENCE LENGTH GENERATED BY MODE 4 |
|---|---|---|---|---|
| 1 | 12 | 11 | 13 | 11 or 13 |
| 2 | 24 | 23 | 29 | 23 |
| 3 | 36 | 31 | 37 | 37 |
| 4 | 48 | 47 | 53 | 47 |
| 5 | 60 | 59 | 61 | 59 or 61 |
| 6 | 72 | 71 | 73 | 71 or 73 |
| 7 | 84 | 83 | 89 | 83 |
| 8 | 96 | 89 | 97 | 97 |
| 9 | 108 | 107 | 109 | 107 or 109 |
| 10 | 120 | 113 | 127 | 122(=61x2) |
| 11 | 132 | 131 | 137 | 131 |
| 12 | 144 | 139 | 149 | 146(=73x2) |
| ... | ... | ... | ... | ... |
| 17 | 204 | 199 | 211 | 206(=103x2) |
| 18 | 216 | 211 | 223 | 218(=109x2) |
| ... | ... | ... | ... | ... |
| 25 | 300 | 293 | 307 | 302(=151x2) |
| 26 | 312 | 311 | 313 | 311 or 313 |
| 27 | 324 | 317 | 331 | 326(=163x2) |
| ... | ... | ... | ... | ... |
| 43 | 516 | 509 | 523 | 517(=47x11) |
| 44 | 528 | 523 | 541 | 529(=23x23) |
| 45 | 540 | 523 | 541 | 541 |
| 46 | 552 | 547 | 557 | 554(=277x2) |
| 47 | 564 | 563 | 569 | 563 |
| 48 | 576 | 571 | 577 | 577 |
| 49 | 588 | 587 | 593 | 587 |
| 50 | 600 | 599 | 601 | 599 or 601 |

FIG.14

| RESOURCE BLOCK NUMBER | SUB-CARRIER NUMBER N | PRIME NUMBER SMALLER THAN SUB-CARRIER NUMBER N AND CLOSEST TO N | PRIME NUMBER NOT SMALLER THAN SUB-CARRIER NUMBER N AND CLOSEST TO N | CAZAC SEQUENCE LENGTH GENERATED BY MODE 5 |
|---|---|---|---|---|
| 1 | 12 | 11 | 13 | 11 or 13 |
| 2 | 24 | 23 | 29 | 23 |
| 3 | 36 | 31 | 37 | 37 |
| 4 | 48 | 47 | 53 | 47 |
| 5 | 60 | 59 | 61 | 59 or 61 |
| 6 | 72 | 71 | 73 | 71 or 73 |
| 7 | 84 | 83 | 89 | 83 |
| 8 | 96 | 89 | 97 | 97 |
| 9 | 108 | 107 | 109 | 107 or 109 |
| 10 | 120 | 113 | 127 | 118(=59x2) |
| 11 | 132 | 131 | 137 | 131 |
| 12 | 144 | 139 | 149 | 142(=71x2) |
| ... | ... | ... | ... | ... |
| 17 | 204 | 199 | 211 | 202(=101x2) |
| 18 | 216 | 211 | 223 | 214(=107x2) |
| ... | ... | ... | ... | ... |
| 25 | 300 | 293 | 307 | 298(=149x2) |
| 26 | 312 | 311 | 313 | 311 or 313 |
| 27 | 324 | 317 | 331 | 323(=19x17) |
| ... | ... | ... | ... | ... |
| 43 | 516 | 509 | 523 | 514(=257x2) |
| 44 | 528 | 523 | 541 | 526(=263x2) |
| 45 | 540 | 523 | 541 | 541 |
| 46 | 552 | 547 | 557 | 551(=29x19) |
| 47 | 564 | 563 | 569 | 563 |
| 48 | 576 | 571 | 577 | 577 |
| 49 | 588 | 587 | 593 | 587 |
| 50 | 600 | 599 | 601 | 599 or 601 |

METHOD AND APPARATUS FOR REFERENCE SIGNAL GENERATION IN WIRELESS COMMUNICATION SYSTEM

REFERENCE TO RELATED APPLICATION

This application is based upon and claims the benefit of the priority of Japanese patent application No. 2007-026150, filed on Feb. 5, 2007, the disclosure of which is incorporated herein in its entirety by reference thereto.

FIELD OF THE INVENTION

The present invention relates to a wireless communication system, and particularly to a wireless communication system in which a transmission signal and a reference signal (also known as pilot signal) are multiplexed and to a method and apparatus for generating the reference signal.

BACKGROUND OF THE INVENTION

The background of the present invention will be explained using a 3GPP wireless communication system shown in FIG. 1 as an example.

FIG. 1A is a block diagram showing a general wireless mobile communication system and FIG. 1B is a format diagram showing an example of a frame structure of a signal transmitted/received between a base station and a mobile terminal, referred to as "user equipment". As shown in FIG. 1B, a frame (subframe) has a frame length of, for instance, 0.5 ms, and while a plurality of blocks having a predetermined length are time-multiplexed, a plurality of resource blocks are frequency-multiplexed in a predetermined frequency band with a predetermined number N of sub-carriers as a resource block.

In wireless communication, a reference signal is generally multiplexed with a transmission signal, and using the received reference signal, channel estimation, link adaptation, and CQI (Channel Quality Indicator) measurement for scheduling are performed.

In order to perform channel estimation using the reference signal, the receiver must know the sequence of the reference signal transmitted. As such a sequence, CAZAC (Constant Amplitude Zero Auto-Correlation) sequence has gained much attention in recent years. Since CAZAC sequences have a constant amplitude in the time domain, PAPR (Peak-to-Average Power Ratio) can be minimized. Further, they performs well in channel estimation in the frequency domain because their amplitude is also constant in the frequency domain. Further, since the CAZAC sequences have perfect autocorrelation properties, they are suitable for the timing detection of the received signal. They have also gained much attention as sequences suitable for single carrier transmission. Therefore, Zadoff-Chu sequences, a kind of the CAZAC sequences, are used in 3GPP LTE (Long Term Evolution) as uplink reference signal sequences (Non-Patent Document 1). The Zadoff-Chu sequence Pk is represented by the following equations (1) or (2).

[EQUATION 1]
When a sequence length L is an even number:

$$P_k = (a_k(0), a_k(I), \ldots, a_k(L-1)), a_k(n) = \exp(-j2\pi k n^2/2/L) \quad (1)$$

$(n=0, 1, \ldots, L-1)$

[EQUATION 2]
When the sequence length L is an odd number:

$$P_k = (a_k(0), a_k(1), \ldots, a_k(L-1)), a_k(n) = \exp(-j2\pi k n(n+1)/2/L) \quad (2)$$

$(n=0, 1, \ldots, L-1)$

However, as described below, the number of available CAZAC sequences is limited. The sequence number of CAZAC sequences depends on the sequence length L, and in the case of the Zadoff-Chu sequences, the sequence number is the greatest when the sequence length L is a prime number. The greatest sequence number at this time is equal to (L−1). When it is necessary to generate as many unique CAZAC sequences $P_1, P_2, P_3 \ldots$ as possible and assign each of them to a base station, it is optimal to use sequences whose sequence length L is a prime number in order to have the greatest number of sequences. As described below, a reference signal has conventionally been generated using this method.

FIG. 2 is a flowchart showing a conventional method for generating a reference signal. First, a CAZAC sequence having a sequence length of a prime number closest to the sub-carrier number N in the resource block is selected (step S10). Then, a plurality of reference signal sequences are generated from the selected CAZAC sequence by the well-known cyclic shift method (step S11). The generated reference signal sequences can be assigned to a plurality of user equipments UE (mobile terminals).

However, the sub-carrier number N, the resource size of a reference signal, is not normally a prime number. As shown in FIG. 1B, in LTE, the resource size of a data signal is 12 sub-carriers (1 resource block) multiplied by an integer, and the number of the sub-carriers in a resource block of the reference signal corresponding to this is also 12 sub-carrier multiplied by an integer. Therefore, the sub-carrier number N in a resource block of the reference signal will be 12, 24, 36, .... Meanwhile, a sequence length of a prime number closest to the sub-carrier number N has to be used in order to have a greatest number of sequences. These are 11, or 13, 23, 37 ..., and they don't coincide with the sub-carrier number N in a resource block of the reference signal. For such a case where the resource size (the sub-carrier number) of the reference signal and a length of a prime number don't coincide, several methods in which CAZAC sequences having a length of a prime number are allocated to sub-carriers in the resource block of the reference signal have been proposed.

FIG. 3A is a diagram showing the frequency structure of the resource block of the reference signal; FIG. 3B is a sequence allocation diagram when a sequence having a length of a prime number is allocated to sub-carriers without any change; FIG. 3C is a sequence allocation diagram when the sequence is allocated with one code cyclically copied; and FIG. 3D is a sequence allocation diagram when a sequence is allocated with one code being truncated.

The method indicated by FIG. 3B is described in Non-Patent Document 2. If a sequence (#1 to #11) with the number of its length smaller than the sub-carrier number N in the resource block is allocated without any change, no reference signal will be allocated to the last of 12 sub-carriers.

In the method shown in FIG. 3C, in which one code is cyclically copied, by compensating the difference between the sequence (#1 to #11) and the sub-carrier number N=12 in the resource block by performing a cyclic copy, the sequence is adjusted so that it matches the sub-carrier number N=12 in the resource block (Patent Document 1).

Further, in the method shown in FIG. 3D, in which one code is truncated, by truncating the sequence (#1 to #13) with the number of its length larger than the sub-carrier number N=12 in the resource block at the sub-carrier number N=12 in the resource block, the sequence is adjusted so that it matches the sub-carrier number N=12 in the resource block (Patent Document 1).

[Non-Patent Document 1]
3GPP TR 25.814 v2.0.0, June, 2006
[Non-Patent Document 2]
3GPP R1-063369 Nokia, "CAZAC Sequence Length for E-UTRA UL," Nov. 6-10, 2006
[Patent Document 1]
US2005/0226140A1

SUMMARY OF THE DISCLOSURE

The following analyses are given underlying the problems to be solved by the present invention. The entire disclosure of the above mentioned non-patent documents and patent document are incorporated herein by reference thereto.

As described above, in order to have the greatest number of sequences available, it is optimal to select a prime number as a sequence length of CAZAC sequences, however, when many resource blocks are assigned to one user equipment, the difference between the resource size of the reference signal and the CAZAC sequence length may become too large. For instance, assume that a resource block size (the sub-carrier number N) is set at 120, the closest prime numbers are 113 and 127. When 113 is used as the prime number (length), the number of sequences available is 112 and the cross (mutual)-correlation is not larger than $1/\sqrt{113}$. However, the difference between the resource size of the reference signal and the CAZAC sequence length is as large as 7. When 127 is used as the prime number (length), the number of sequences available is 126 and the cross (mutual)-correlation is not larger than $1/\sqrt{127}$. However, the difference between the resource size of the reference signal and the CAZAC sequence length is also as large as 7. (Note that $\sqrt{x}$ represents the square root of x, likewise hereinafter.)

In such a case where the difference between the sequence length of a prime number and the resource size (the sub-carrier number N) of the reference signal is large, the following problems may occur.

In the method shown in FIG. 3B in which the sequence is allocated without any change, the power loss of the reference signal corresponding to an edge of the transmission band of the data signal increases significantly and the channel estimation performance will deteriorate. Further, in the cyclic copy method in FIG. 3C and the truncation method in FIG. 3D, the cross (mutual)-correlation properties of the reference signal will deteriorate, and so will the autocorrelation properties and the peak-to-average power ratio (PAPR). Particularly, when the number of the resource blocks of the reference signal is equal to or larger than 10, i.e., when the sub-carrier number N is equal to or larger than 120, it is desired that the deterioration of the cross (mutual)-correlation properties and the other properties be avoided.

It is an object of the present invention to provide a reference signal generation method and apparatus capable of making the difference between the resource size of the reference signal and a sequence length of a prime number small while maintaining the performance of the reference signal sequences.

It is another object of the present invention to provide a reference signal generation method and apparatus capable of generating many reference signal sequences having excellent properties as sequences. Further objects of the present invention will become apparent in the entire disclosure including the claims and drawings.

According to the present invention, as an indicator for determining the CAZAC sequence length used for a reference signal, in addition to the number of sequences available, the difference between the sub-carrier number in the resource block of the reference signal and the CAZAC sequence length is used.

Particularly, the following various aspects are presented by the present invention.

According to a first aspect of the present invention, at least one first CAZAC sequence length that satisfies a condition that an absolute value of a difference between a predetermined sub-carrier number and a sequence length number is not larger than a predetermined threshold value is selected; a second CAZAC sequence length having a largest among greatest prime factors constituting each sequence length is selected from the at least one first CAZAC sequence length; and a reference signal is generated from a CAZAC sequence of the second CAZAC sequence length.

According to a second aspect of the present invention, at least one first CAZAC sequence length that satisfies a condition that an absolute value of a difference between a predetermined sub-carrier number and a sequence length number is not larger than a predetermined threshold value is selected; a second CAZAC sequence length having a sequence length number smaller than the predetermined sub-carrier number and having a largest among greatest prime factors constituting each sequence length is selected from the at least one first CAZAC sequence length; a third CAZAC sequence length having a sequence length number larger than the predetermined sub-carrier number and having a largest among greatest prime factors constituting each sequence length is selected from the at least one first CAZAC sequence length; a fourth CAZAC sequence length whose difference from the predetermined sub-carrier number is smaller is selected from the second and third CAZAC sequence lengths; and a reference signal is generated from a CAZAC sequence of the fourth CAZAC sequence length.

Further, according to a third aspect of the present invention, at least one CAZAC sequence length used for a reference signal is selected so that a (sequence) number of CAZAC sequences having a desired cross (mutual)-correlation value (property) is not smaller than a predetermined value and not larger than a predetermined upper limit, and an absolute value of a difference between a predetermined sub-carrier number in a resource block and the CAZAC sequence length number is not larger than a predetermined threshold value. The reference signal is generated from a CAZAC sequence of the selected CAZAC sequence length.

A first CAZAC sequence length may be selected so that the absolute value of a difference between the predetermined sub-carrier number and a sequence length number is the least (refer to claim 2). Further, a CAZAC sequence length having a number of prime factors not larger than a second predetermined value and having a largest among greatest prime factors may be selected as the second CAZAC sequence length from the first CAZAC sequence length satisfying a condition that an absolute value of a difference between the predetermined sub-carrier number and a sequence length number is not larger than a predetermined threshold value.

When there are a plurality of candidates for the CAZAC sequence length, the longest or the shortest sequence length may be selected. In this case, the selection criterion should be determined so that desired results are obtained (refer to claim 4 or 5). For instance, when it is more important to obtain as many CAZAC sequences as possible, the longest sequence should be selected, whereas when it is more important to avoid the property deterioration caused by truncation, the shortest sequence should be selected.

In the second aspect, the first CAZAC sequence length may be selected so that the absolute value of a difference between the predetermined sub-carrier number and a sequence length number may be the least.

A CAZAC sequence length having a number of prime factors not larger than a second predetermined value and having a largest among greatest prime factors may be selected as the second or third CAZAC sequence length from the first CAZAC sequence length(s) satisfying a condition that an absolute value of a difference between the predetermined sub-carrier number and a sequence length number may be not larger than the predetermined threshold value.

In the third aspect, the method may further comprise:

selecting a first CAZAC sequence length having a sequence length number smaller than the predetermined sub-carrier number and satisfying a condition that the number of CAZAC sequences having the desired cross (mutual)-correlation property is not smaller than the predetermined value;

selecting a second CAZAC sequence length having a sequence length number larger than the predetermined sub-carrier number and satisfying a condition that the number of CAZAC sequences having the desired cross (mutual)-correlation property is not smaller than the predetermined value; and selecting a sequence length whose difference from the predetermined sub-carrier number is smaller as the CAZAC sequence length from the first and second CAZAC sequence lengths.

According to a fourth aspect of the present invention, there is provided an apparatus for generating a reference signal, which generates a reference signal using CAZAC sequences, comprising:

CAZAC sequence selecting means for selecting a CAZAC sequence length having a largest among greatest prime factors constituting each sequence length from CAZAC sequence length(s) that satisfy a condition that an absolute value of a difference between the predetermined sub-carrier number and a sequence length number is not larger than a predetermined threshold value; and reference signal generating means for generating the reference signal from a CAZAC sequence of the selected CAZAC sequence length.

According to a fifth aspect, there is provided an apparatus for generating a reference signal, which generates a reference signal using CAZAC sequences, comprising:

first selecting means for selecting at least one first CAZAC sequence length that satisfies a condition that an absolute value of a difference between a predetermined sub-carrier number and a number of sequence length(s) is not larger than a predetermined threshold value;

second selecting means for selecting a second CAZAC sequence length having a sequence length number smaller than the predetermined sub-carrier number and having a largest among greatest prime factors constituting each sequence length from the at least one first CAZAC sequence length and for selecting a third CAZAC sequence length having a sequence length number larger than the predetermined sub-carrier number and having a largest among greatest prime factors constituting each sequence length from the at least one first CAZAC sequence length;

third selecting means for selecting a fourth CAZAC sequence length whose difference from the predetermined sub-carrier number is smaller from the second and third CAZAC sequence lengths; and reference signal generating means for generating a reference signal from a CAZAC sequence of the fourth CAZAC sequence length.

According to a sixth aspect, there is provided a wireless communication apparatus in a wireless communication system that performs wireless communication by multiplexing a transmission signal with a reference signal, comprising:

the reference signal generating apparatus according to the fourth aspect; and communicating means for communicating with other wireless apparatus(es) using the reference signal.

According to a seventh aspect, there is provided a wireless communication apparatus in a wireless communication system that performs wireless communication by multiplexing a transmission signal with a reference signal, comprising:

the reference signal generating apparatus according to the fifth aspect; and communicating means for communicating with other wireless apparatus(es) using the reference signal.

According to an eighth aspect, there is provided a wireless communication system that performs wireless communication by multiplexing a reference signal between a transmission device and a reception device, wherein the transmission device comprises:

transmission reference signal generating means for generating a transmission reference signal by allocating a transmission reference signal sequence(s) generated from a CAZAC sequence(s) to a resource block(s); and transmitting means for multiplexing a transmission signal and the transmission reference signal and transmitting them to the reception device;

the reception device comprises:

reception reference signal generating means for generating a reception reference signal by allocating a reception reference signal sequence(s) generated from a CAZAC sequence(s) to the resource block(s); and receiving means for receiving the transmission signal and the transmission reference signal from the transmission device using the reception reference signal;

the transmission reference signal generating means comprising:

transmission CAZAC sequence selecting means for selecting a transmission CAZAC sequence length having a largest among greatest prime factors constituting each sequence length from CAZAC sequence length(s) that satisfy a condition that an absolute value of a difference between a predetermined sub-carrier number in the resource block and a number of the sequence length is not larger than a predetermined threshold value; and transmission reference signal sequence generating means for generating the transmission reference signal sequence from a CAZAC sequence of the selected transmission CAZAC sequence length;

the reception reference signal generating means comprising:

reception CAZAC sequence selecting means for selecting a reception CAZAC sequence length having a largest among greatest prime factors constituting each sequence length from CAZAC sequence length(s) that satisfy a condition that an absolute value of a difference between a predetermined sub-carrier number in the resource block and a sequence length number is not larger than a predetermined threshold value; and reception reference signal sequence generating means for generating the reception reference signal sequence from a CAZAC sequence of the selected reception CAZAC sequence length; and at least one of the transmission and reception reference signal generating means is preset so that the transmission CAZAC sequence and the reception CAZAC sequence are identical.

According to a ninth aspect, there is provided a wireless communication system that performs wireless communication according to the wireless system of the eight aspect.

According to a tenth aspect, there is provided a mobile communication system that performs wireless communication by multiplexing a reference signal between a plurality of user equipments and a base station, wherein the base station and each of the plurality of user equipments comprise:

reference signal generating apparatus (or means) according to the fourth aspect; and communicating means for communicating using said reference signal;

wherein identical reference signal sequences are used between the base station and each user equipment by having the base station specify the resource block(s) and the CAZAC sequence, for each user equipment, used for the communication with the user equipment.

According to an eleventh aspect, there is provided a mobile communication system that performs wireless communication by multiplexing a reference signal between a plurality of user equipments and a base station, according to the mobile communication sytem of the tenth aspec.

According to a twelfth aspect, there is provided a base station in a mobile communication system that performs wireless communication by multiplexing a reference signal, comprising:

reference signal generating means according to the fourth aspect; and communicating means for communicating with each user equipment using the reference signal.

According to a thirteenth aspect, there is provided a base station in a mobile communication system that performs wireless communication by multiplexing a reference signal, according to the base station of the twelfth aspect.

According to a fourteenth aspect, there is a user equipment in a mobile communication system that performs wireless communication by multiplexing a reference signal, comprising:

reference signal generating means according to the fourth aspect; and communicating means for communicating with a base station using the reference signal.

According to a fifteenth aspect, there is a user equipment in a mobile communication system that performs wireless communication by multiplexing a reference signal according to the user equipment in a mobile communication system of the fourteenth aspect.

According to a sixteenth aspect, there are provided programs that are used for executing the steps in any one of the methods according to the first through third aspects, as well as operating the apparatus, systems and so on according to the preceding aspect.

Particularly, there is provided a program, in an apparatus that generates a reference signal by allocating a CAZAC sequence(s) to a resource block(s), having a computer execute the steps of the method according to the first aspect.

Further, there is provided a program, in an apparatus that generates a reference signal by allocating a CAZAC sequence(s) to a resource block(s), having a computer execute the steps of the method according to the second aspect.

The meritorious effects of the present invention are summarized as follows.

According to the present invention, a CAZAC sequence length having a largest among greatest prime factors constituting each sequence length is selected from CAZAC sequence lengths satisfying a condition that an absolute value of a difference between a predetermined sub-carrier number and a sequence length number is not larger than a predetermined threshold value, and a reference signal is generated from a CAZAC sequence of the selected CAZAC sequence length.

Or a CAZAC sequence length having a sequence length number smaller than a predetermined sub-carrier number and having a largest among greatest prime factors constituting each sequence length and a CAZAC sequence length having a sequence length number larger than the predetermined sub-carrier number and having a largest among greatest prime factors constituting each sequence length are selected from CAZAC sequence lengths satisfying a condition that an absolute value of a difference between the predetermined sub-carrier number and a sequence length number is not larger than a predetermined threshold value; a CAZAC sequence length whose difference from the predetermined sub-carrier number is smaller is selected from the selected CAZAC sequence lengths; and a reference signal is generated from the selected CAZAC sequence length.

By generating the reference signal as described, the difference between the resource block size of the reference signal and the CAZAC sequence length can be significantly reduced, compared with the conventional methods, and furthermore, many usable sequences having excellent cross (mutual)-correlation property can be obtained.

BRIEF DESCRIPTION OF THE DRAWINGS

FIG. 2 is a flowchart of a related art showing a conventional method for generating a reference signal.

FIGS. 3A-3D represent analyses on the related art according to the present invention; that is: FIG. 3A is a diagram showing the frequency structure of the resource block of a reference signal; FIG. 3B is a sequence allocation diagram when a sequence having a length of a prime number is allocated without any change; FIG. 3C is a sequence allocation diagram when a sequence is allocated with one code cyclically copied; and FIG. 3D is a sequence allocation diagram when a sequence is allocated with a code truncated.

FIG. 4 is a schematic block diagram showing the functional configuration of a reference signal generating apparatus according to an aspect of the present invention.

FIG. 6 is a table showing the results obtained by applying the CAZAC sequence selection method according to the first mode of the present invention to the resource block numbers 1 to 50 in LTE.

FIG. 8 is a table showing the results obtained by applying the CAZAC sequence selection method according to the second mode of the present invention to the resource block numbers 1 to 50 in LTE.

FIG. 10 is a table showing the results obtained by applying the CAZAC sequence selection method according to the third mode of the present invention to the resource block numbers 1 to 50 in LTE.

FIG. 12 is a table showing the results obtained by applying the CAZAC sequence selection method according to the fourth mode of the present invention to the resource block numbers 1 to 50 in LTE.

FIG. 14 is a table showing the results obtained by applying the CAZAC sequence selection method according to the fifth mode of the present invention to the resource block numbers 1 to 50 in LTE.

PREFERRED MODES OF THE INVENTION

Figure 1A:
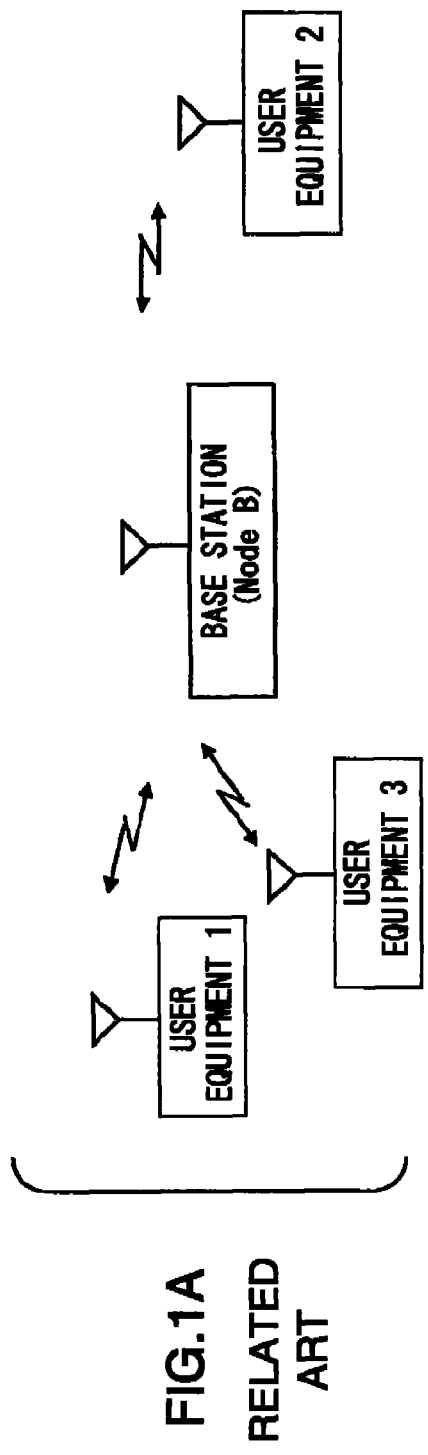
FIG. 1A is a block diagram showing a general wireless mobile communication system.

First, the scheme and the basic structure of the present invention will be explained, and based on them, and modes and examples of the present invention will be described in detail.

1. The Scheme of the Present Invention

In order to reduce the difference between the reference signal size and the Zadoff-Chu sequence length, the greatest prime factor is used as a criterion for selecting a sequence length. For instance, when there are two sequence lengths 118 (=59×2) and 119 (=17×7), a prime factor 59, the largest prime factor among these prime factors or among these greatest prime factors, is the greatest prime factor. The reason why the greatest prime factor is used as the criterion for selecting a sequence length is as follows.

The cross (mutual)-correlation R between two different sequences Pk and Pk' can be represented by the following equation where g is the greatest common divisor of a difference between these sequence numbers (k−k') and the sequence length L:

[EQUATION 3]

When n is not a multiple of g, $$R[P_k(n), P_{k'}(n)] = 0$$

When n is a multiple of g, $$R[P_k(n), P_{k'}(n)] = \sqrt{g}/\sqrt{L}$$

According to these equations, the smaller the greatest common divisor g between (k−k') and L gets, the better the cross (mutual)-correlation becomes.

Let the greatest prime factor of L be Li, g is smaller than Li when k and k' are smaller than Li. This means that the number of sequences having cross (mutual)-correlations not larger than $1/\sqrt{Li}$ increases. Therefore, it is rational to select a number having a large one of the greatest prime factor.

Meanwhile, taking the fact that k and k' are smaller than Li into consideration, the number of sequences available decreases as the number of prime factors increases. For instance, in the case where the block size of the reference signal is 120, 118 (=59×2) is not a prime number, however, it includes a large prime factor 59. In this case, available sequences k, k' are: k, k'={1, 3, 5, 7, 9, ..., 57, 61, ..., 115, 117}. Since k and k' are mutually prime to L, 2 or multiples of 59 are excluded, and as a result, the total number of available codes is 57. In this case, since k and k' are odd numbers and (k−k') is always an even number, these sequences all have cross (mutual)-correlations not larger than $1/\sqrt{59}$.

In this example, the difference between the resource block size of the reference signal and the CAZAC sequence length is reduced from "7" in the conventional example to "2," and furthermore, many usable sequences having excellent cross (mutual)-correlation properties can be obtained.

As evident from this example, the number of available k, k' smaller than the greatest prime factor decreases as the number of prime factors increases. Therefore, it is also rational to select a sequence length having a large greatest prime factors and a small number of prime factors.

As described above, CAZAC sequences for generating the reference signal are determined using Scheme A or B below in the present invention.

Scheme A:
  Step A1) CAZAC sequence lengths L that meet $|N−L| \leq K$ are selected (where N denotes the sub-carrier number and K is a natural number);
  Step A2) A CAZAC sequence length having a largest of the greatest prime factors is selected from the selected CAZAC sequence lengths L.

Scheme B:
  Step B1) CAZAC sequence lengths L that meet $|N−L| \leq K$ are selected (where N denotes the sub-carrier number and K is a natural number);
  Step B2) CAZAC sequence lengths having a largest of the greatest prime factors when L<N and when L>N are respectively selected from the CAZAC sequence lengths L selected in the step B1.
  Step B3) A CAZAC sequence length having the smallest $|N−L|$ is selected from the CAZAC sequence lengths L selected in the step B2; provided that when two such sequence lengths exist, a shorter sequence length is selected. Or a predetermined criterion can be used for the selection.

By generating the reference signal according to the schemes above, the difference between the resource block size of the reference signal and the CAZAC sequence length can be reduced significantly, compared with the conventional example, and furthermore, many usable sequences having excellent cross (mutual)-correlation properties can be obtained.

Scheme A or B described above can be employed with any number of the resource blocks (i.e., any sub-carrier number), however, it can also be applied only to a case where the difference between the sub-carrier number N and the prime number (length) of the CAZAC sequence is larger than 1.

2. Basic Apparatus Configuration

FIG. 4 is a schematic block diagram showing the functional configuration of a reference signal generating apparatus according to an aspect of the present invention. The reference signal generating apparatus has a reference signal generating unit comprised of a CAZAC sequence generating unit 101, a reference signal sequence generating unit 102, and a CAZAC sequence selecting unit 103, and a control unit 104 that controls the reference signal generating unit.

The CAZAC sequence generating unit 101 generates CAZAC sequences specified by the CAZAC sequence selecting unit 103. For instance, CAZAC sequences can be generated using the equations (1) and (2) above according to specified parameters (the sequence length L and the sequence number k) and cyclic shifts. Alternatively, required CAZAC sequences may be stored in memory in advance and CAZAC sequences may be generated according to arguments specified by the CAZAC sequence selecting unit 103 and cyclic shifts.

The CAZAC sequence selecting unit 103 determines parameters or arguments for generating CAZAC sequences according to Scheme A or B indicating the CAZAC sequence selection criteria described above and outputs them to the CAZAC sequence generating unit 101 while performing cyclic shifts. Sequence selections described later in each mode is performed by the CAZAC sequence selecting unit 103.

The reference signal sequence generating unit 102 allocates the CAZAC sequences to each sub-carrier in the resource block of the reference signal according to a method (the cyclic copy method or the truncation method described in FIGS. 3C and 3D) specified by the control unit 104 and generates reference signal sequences.

3. Mode 1

Figure 5:
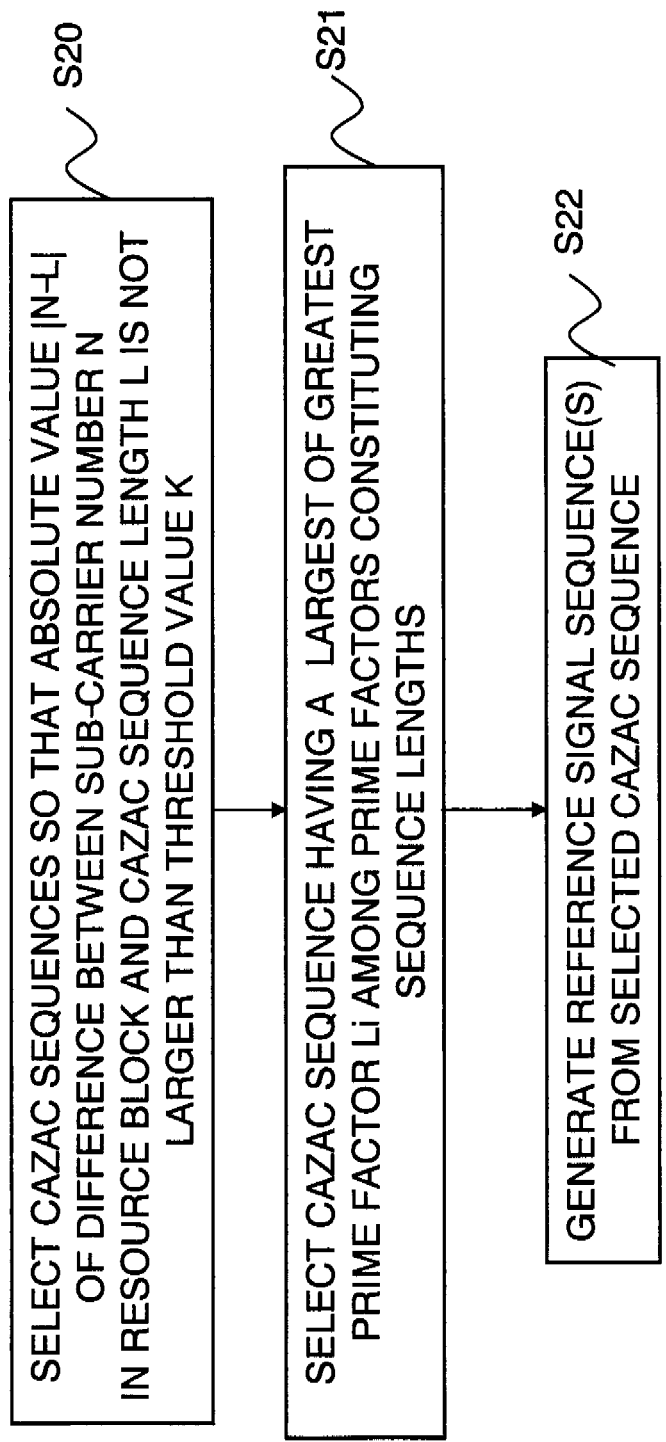
FIG. 5 is a flowchart showing a method for generating a reference signal according to a first mode of the present invention.

FIG. 5 is a flowchart showing a method for generating a reference signal according to a first mode of the present invention. In the present mode, CAZAC sequences are selected according to Scheme A described above.

First, CAZAC sequences satisfying a condition that an absolute value |N−L| of a difference between the sub-carrier number N in the resource block and the CAZAC sequence length L is not larger than a threshold value K are selected (step S20). Next, a CAZAC sequence having a largest of the greatest prime factors among the prime factors constituting the sequence lengths is selected from the selected CAZAC sequences (step S21). Reference signal sequences are generated from the selected CAZAC sequence according to the cyclic copy or truncation method described in FIG. 3C or 3D (step S22).

Note that, when there are two sequences having a largest of the greatest prime factors in the step S21, a predetermined criterion may be used to determine the sequence length (e.g., it may be based on the priority: the number of sequences or the deterioration of properties). For instance, when it is more important to obtain as many CAZAC sequences as possible, the longer sequence should be selected; whereas when it is more important to avoid the property deterioration caused by truncation, the shorter sequence should be selected, respectively for determining the sequence length uniquely.

More concretely, a case where K=2 and the resource block number is 10 (the sub-carrier number N=120) will be explained. First, the following five sequence lengths that satisfy the condition that K is not larger than 2 are selected: 118(=59×2), 119(=17×7), 120(=5×3×2³), 121(=11×11), and 122(=61×2) (step S20). Among these prime factors, the largest of the greatest prime factor is 61, and the sequence length that includes it is 122. Thus, the CAZAC sequence having the length of 122 is selected (step S21).

If the sequence is selected based on the length of the prime number as in the conventional example, the sequence length will be 113 or 127 (refer to line of RESOURCE BLOCK NUMBER 10, in FIG. 6). Therefore, the difference (|N−L|) between the sub-carrier number N and the sequence length L is reduced to 2 from 7, in the present mode. In this case, since L<N, the sequence may be used without any change (FIG. 3B) or it may be allocated according to the cyclic copy method (FIG. 3C).

FIG. 6 is a table showing the results obtained by applying the CAZAC sequence selection method according to the first mode of the present invention to the resource block numbers 1 to 50 in LTE. As shown in FIG. 6, the difference between the sub-carrier number N and the sequence length is reduced to 2 from 7 not only in the case where the sub-carrier number N=120, but also in the case where the sub-carrier number N=204. Moreover, the effect of the present mode is notable in the underlined resource block numbers.

As evident from FIG. 6, when the difference between the closest prime number and the sub-carrier number N is smaller than K, the same results as one of the conventional methods are obtained. For instance, when the resource block number is 1 (the sub-carrier number N=12), a prime number 13, which is not smaller than N and is the closet prime number to N, is selected as a sequence length. In this case, the allocation may be effected according to the truncation method. Further, when the resource block number is 2 (N=24), a prime number 23, which is smaller than N and is the closet prime number to N, is selected, therefore the allocation is performed according to the cyclic copy method. When the resource block number is 45 (the sub-carrier number N=540), a prime number 541, which is not smaller than N and is the closet prime number to N, is selected as the sequence length, therefore the allocation is performed according to the truncation method.

On the other hand, in the underlined cases where the resource block numbers are not smaller than 10, it can be confirmed that the differences between the sub-carrier numbers N and the sequence lengths are significantly reduced, compared with the conventional methods. In this example, it may be controlled so that the present mode is applied only to the cases where the difference between the sub-carrier number N and the prime number closest to N is equal to or larger than 2, or only to the cases with the underlined resource block numbers.

As described above, by selecting CAZAC sequences that satisfy the condition that the absolute value (|N−L|) of a difference between the sub-carrier number N in the resource block and the CAZAC sequence length L is not larger than the threshold value K and further selecting a sequence having a largest of the greatest prime factors from the initially selected sequences, many reference signal sequences having excellent properties can be obtained.

4. Mode 2

Figure 7:
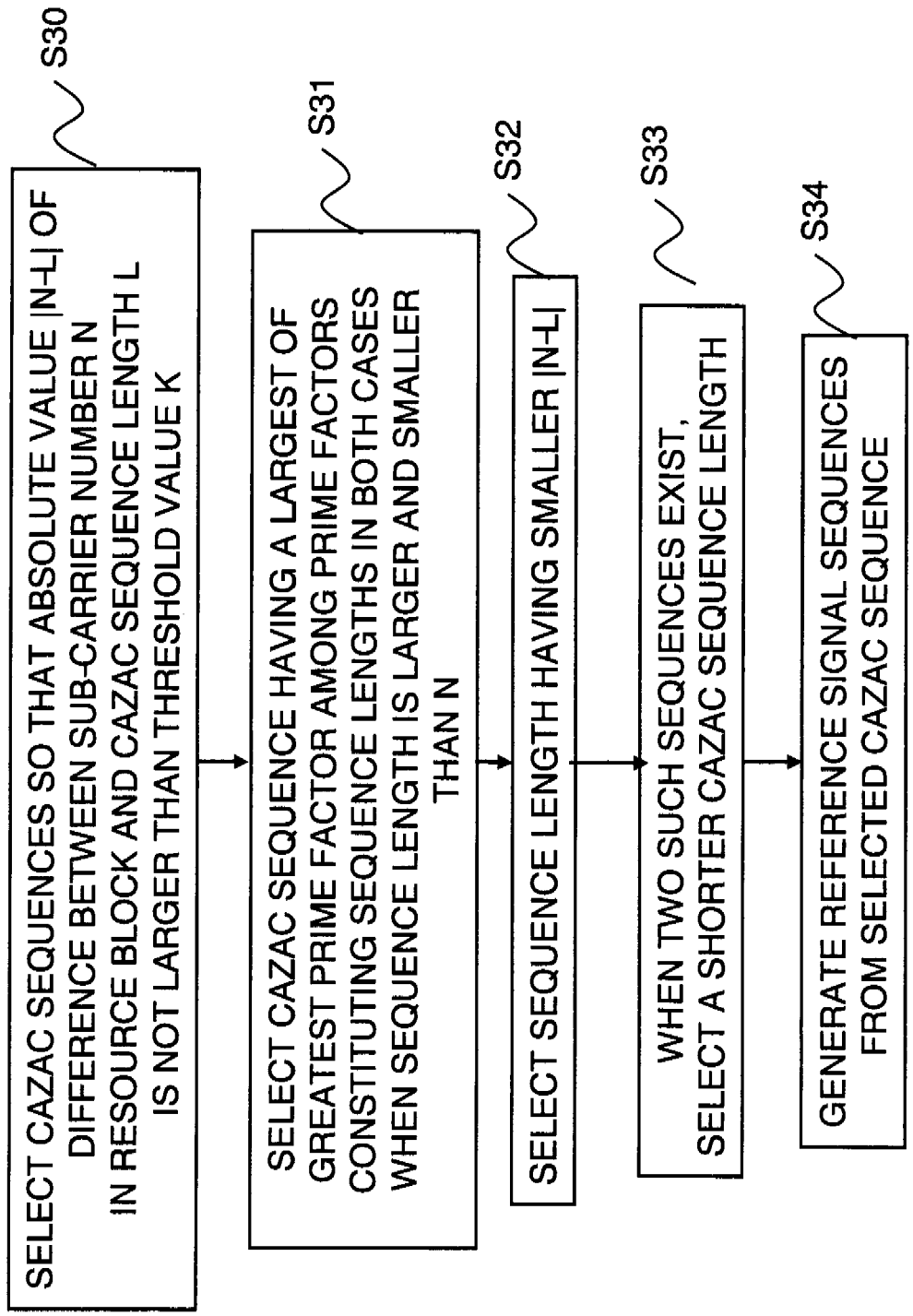
FIG. 7 is a flowchart showing a method for generating a reference signal according to a second mode of the present invention.

FIG. 7 is a flowchart showing a method for generating a reference signal according to a second mode of the present invention. In the present mode, CAZAC sequences are selected according to Scheme B described above.

First, CAZAC sequences satisfying a condition that an absolute value |N−L| of a difference between the sub-carrier number N in the resource block and the CAZAC sequence length L is not larger than the threshold value K are selected (step S30). Next, CAZAC sequences having a largest of the greatest prime factors among the prime factors constituting the sequence lengths are selected from the selected CAZAC sequences in both cases where the sequence length L is smaller than N and larger than N, respectively (step S31).

Then, the sequence(s) having a smaller (or smallest) |N−L| is selected from the sequences selected in the step S31 (step S32), and when two such sequences exist, one having a shorter sequence length is selected (step S33). Reference signal sequence(s) is/are generated from the selected CAZAC sequence according to the cyclic copy or truncation method described in FIG. 3C or 3D, respectively (step S34).

Note that, when there are two sequences having the smallest |N−L| in the step S33, a predetermined criterion may be used to determine the sequence length (for example, based on the priority of either the number of sequences or the deterioration of property). For instance, when it is more important to obtain as many CAZAC sequences as possible, the longer sequence should be selected, whereas when it is more important to avoid the property deterioration caused by truncation, the shorter sequence should be selected, respectively, for uniquely determining the sequence length.

More concretely, a case where K=2 and the resource block number is 10 (the sub-carrier number N=120) will be explained. First, the following five sequence lengths that satisfy the condition that K is not larger than 2 are selected: 118(=59×2), 119(=17×7), 120(=5×3×$2^3$), 121(=11×11), and 122(=61×2) (step S30).

Next, the sequence lengths that meet the condition N>L are 118(=59×2) and 119(=17×7) and the sequence that includes a largest (59) of the greatest prime factors (59, 17) between them is 118, therefore this sequence is selected. Further, the sequence lengths that meet the condition N<L are 121(=11×11) and 122(=61×2) and the sequence that includes a largest (61) of greatest prime factors (11, 61) between them is 122, therefore this sequence is also selected (step S31).

Since the sequence lengths L=118 and 122 selected in the step S31 have the same value of |N−L| (2), the both sequence lengths 118 and 122 are selected in the step S32, and in the next step S33, the shorter sequence length 118 among these two (118 and 122) is selected. As mentioned above, the sequence length may be determined by the other factors based on the priority of such as the number of sequences or the property deterioration.

If a sequence having a length of a prime number would be selected as in the conventional example, the sequence length would be 113 or 127. Therefore, the difference between the sub-carrier number N and the sequence length is significantly reduced to 2 from 7, in the present mode. In this case, since L<N, the sequence may be used without any change (FIG. 3B) or it may be allocated according to the cyclic copy method (FIG. 3C).

FIG. 8 is a table showing the results obtained by applying the CAZAC sequence selection method according to the second mode of the present invention to the resource block numbers 1 to 50 in LTE. As shown in FIG. 8, in addition to the case where the sub-carrier number N=120, the difference between the sub-carrier number N and the sequence length is also reduced to 2 from 5 in the case where the sub-carrier number N=204, compared with the conventional example. Moreover, the effect of the present mode is notable in the underlined resource block numbers (refer to: 10, 12, 17, 18, 25, 27, 43, 44 and 46 in FIG. 8).

As evident from FIG. 8, when the difference between the closest prime number and the sub-carrier number N is smaller than K, the same results as one of the conventional methods are obtained. For instance, when the resource block number is 1 (the sub-carrier number N=12), 11, which is smaller than N and is the closet prime number to N, is selected as the sequence length. In this case, the sequence may be allocated according to the cyclic copy method. Further, when the resource block number is 3 (N=36), 37, which is not smaller than N and is the closet prime number to N, is selected, thus the sequence is allocated according to the truncation method. Furthermore, when the resource block number is 45 (the sub-carrier number N=540), 541, which is not smaller than N and is the closet prime number to N, is selected as the sequence length, therefore the allocation is performed according to the truncation method.

On the other hand, in the underlined cases where the resource block numbers are not smaller than 10, it can be confirmed that the differences between the sub-carrier numbers N and the sequence lengths are significantly reduced, compared with the conventional methods. In this example, it may be controlled so that the present mode is applied only to the cases where the difference between the sub-carrier number N and the prime number closest to N is equal to or larger than 2 or to the cases with the underlined resource block numbers.

As described above, by selecting CAZAC sequences that satisfy the condition that the absolute value (|N−L|) of a difference between the sub-carrier number N in the resource block and the CAZAC sequence length L is not larger than the threshold value K, further selecting sequences having a largest of the greatest prime factors from the initially selected sequences in both cases where N>L and N<L, respectively, and finally selecting the sequence having the smallest |N−L|, many reference signal sequences having excellent properties can be obtained.

5. Mode 3

Figure 9:
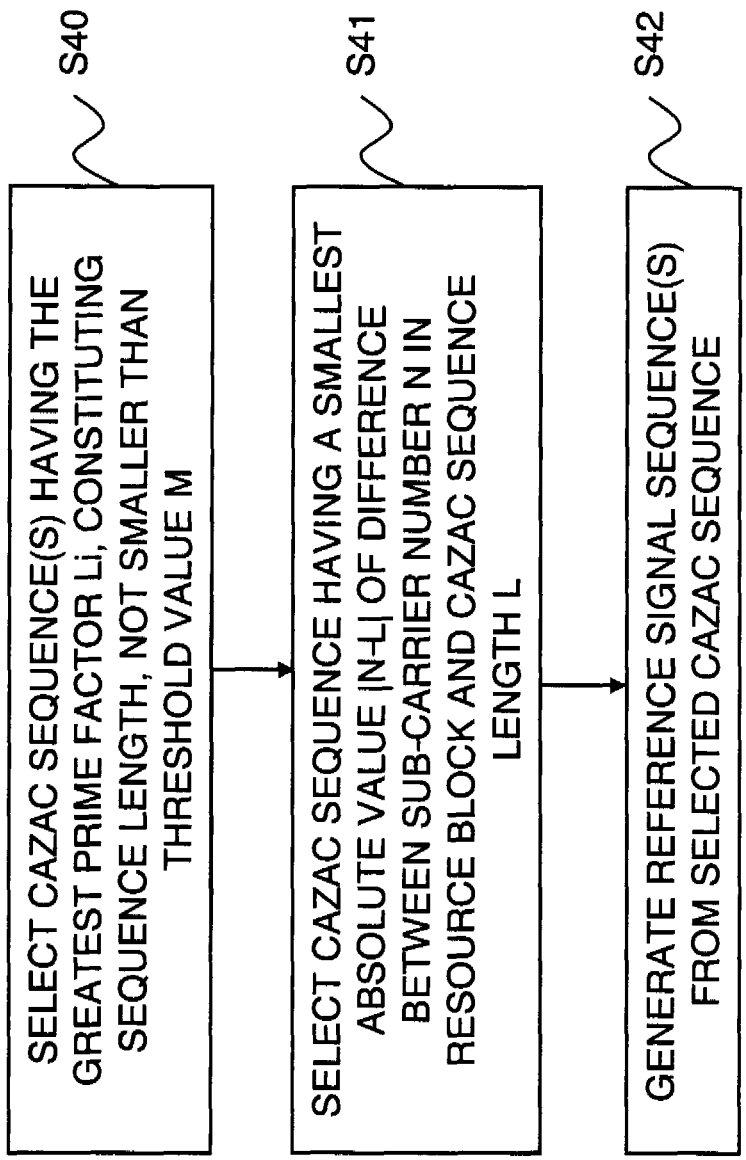
FIG. 9 is a flowchart showing a method for generating a reference signal according to a third mode of the present invention.

FIG. 9 is a flowchart showing a method for generating a reference signal according to a third mode of the present invention. In the present mode, sequences having the greatest prime factor equal to or larger (i.e. not smaller) than a predetermined value are selected, and a sequence length having a smallest difference from the sub-carrier number N is selected from the initially selected sequences.

First, CAZAC sequences having the greatest prime factor Li, which constitutes the sequence length, equal to or larger than a threshold value M are selected (step S40), and among which a CAZAC sequence(s) having a smallest absolute value |N−L| of a difference between the sub-carrier number N in the resource block and the CAZAC sequence length L is selected (step S41). Reference signal sequence(s) is/are generated from thus selected CAZAC sequence(s) according to the cyclic copy or truncation method described in FIG. 3C or 3D (step S42).

Note that, when there are two sequences having the smallest |N−L| in the step S41, a predetermined criterion may be used to determine the sequence length (e.g., it may be based on the priority such as the number of sequences or the property deterioration). For instance, when it is more important to obtain as many CAZAC sequences as possible, the longer sequence should be selected, whereas when it is more important to avoid the property deterioration caused by truncation, the shorter sequence should be selected, respectively, for uniquely determining the sequence length.

More concretely, a case where M=13 and the resource block number is 10 (the sub-carrier number N=120) will be explained. First, as sequences satisfying the condition that M is not smaller than 13, . . . , 118(=59×2), 119(=17×7), 122 (=61×2), . . . are selected (step S40). Among these selected, a sequence length having a smallest absolute value |N−L| of a difference between the sub-carrier number N in the resource block and the CAZAC sequence length L is the sequence length L=119, thus this sequence is selected (step S41). The difference between the sub-carrier number N and the sequence length can be significantly reduced, compared with the conventional example in which a sequence length of a prime number, 113 or 127, is selected.

If a sequence having a length of a prime number is selected as in the conventional example, the sequence length will be 113 or 127 (refer to FIG. 10, row of RESOURCE BLOCK NUMBER 10, 3rd or 4th column). Therefore, the difference between the sub-carrier number N and the sequence length is significantly reduced to 1 from 7, in the present mode. In this case, since L<N, the sequence may be used without any change (FIG. 3B) or it may be allocated according to the cyclic copy method (FIG. 3C).

FIG. 10 is a table showing the results obtained by applying the CAZAC sequence selection method according to the third mode of the present invention to the resource block numbers 1 to 50 in LTE. As shown in FIG. 10, in addition to the case where the sub-carrier number N=120, the difference between the sub-carrier number N and the sequence length is also reduced to 0 from 5 in the case where the sub-carrier number N=204, compared with the conventional example (199). Further, the difference between the sub-carrier number N and the sequence length is reduced to 1 from 5 in the case where the sub-carrier number N=144. In this case, the sequence length may be selected from the two candidates 143 and 145 based on either one of the aforementioned criteria, the number of sequences or the property deterioration. Moreover, the effect of the present mode is notable in the underlined resource block numbers.

As evident from FIG. 10, when the difference between the closest prime number and the sub-carrier number N is smaller than 2, the same results as one of the conventional methods are obtained. For instance, when the resource block number is 1 (the sub-carrier number N=12), 13, which is not smaller than N and is the closet prime number to N, is selected as the sequence length. In this case, the sequence is allocated according to the cyclic copy [the truncation?] method. Further, when the resource block number is 3 (N=36), 37, which is not smaller than N and is the closet prime number to N, is selected as the sequence length, therefore the allocation is performed according to the truncation method.

On the other hand, in the underlined cases where the resource block numbers are not smaller than 10, it can be confirmed that the differences between the sub-carrier numbers N and the sequence lengths are significantly reduced, compared with the conventional methods. In this example, it may be controlled so that the present mode is applied only to the cases where the difference between the sub-carrier number N and the prime number closest to N is equal to or larger than 2 or to the cases with the underlined resource block numbers.

As described above, by first selecting sequences having the greatest prime factors equal to or larger than the predetermined value M, and further selecting a sequence length having the smallest difference from the sub-carrier number N, many reference signal sequences having excellent properties can be obtained.

6. Mode 4

Figure 11:
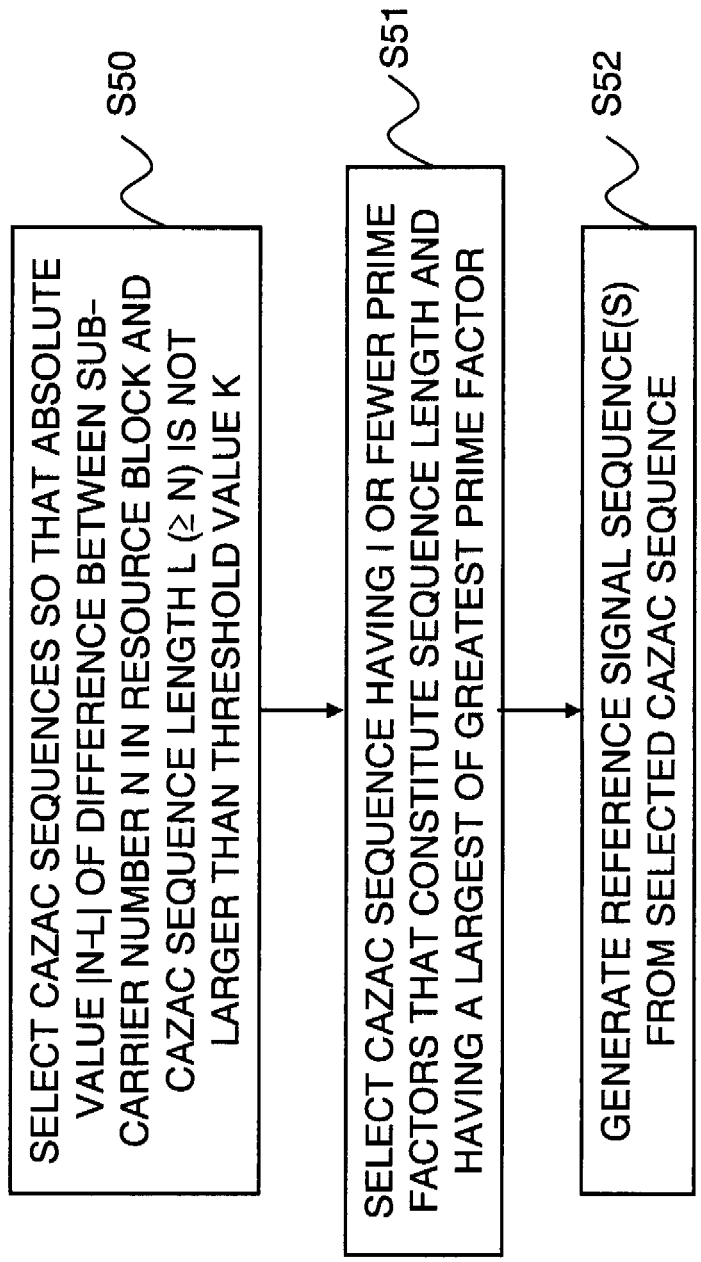
FIG. 11 is a flowchart showing a method for generating a reference signal according to a fourth mode of the present invention.

FIG. 11 is a flowchart showing a method for generating a reference signal according to a fourth mode of the present invention. In the present mode, when the number of the sequence length is equal to or larger than the sub-carrier number N, CAZAC sequences are selected based on Scheme A described above while taking the (occurrence) number of prime factors into consideration.

First, CAZAC sequences satisfying a condition that an absolute value |N−L| of a difference between the sub-carrier number N in the resource block and the CAZAC sequence length L (equal to or larger than N) is not larger than the threshold value K are selected (step S50). Next, a (at least one) CAZAC sequence having I or fewer prime factors that constitute the sequence length and having the greatest prime factors is selected from the selected CAZAC sequences (step S51). Reference signal sequences are generated from the selected CAZAC sequence according to the truncation method described in FIG. 3D (step S52).

Note that, when there are a plurality of sequences satisfying the condition in the step S51, a predetermined criterion may be used to determine the sequence length (e.g., it may be based on the priority: the number of sequences or the property deterioration). For instance, when it is more important to obtain as many CAZAC sequences as possible, the longer sequence should be selected, whereas when it is more important to avoid the property deterioration caused by truncation, the shorter sequence should be selected, respectively, for uniquely determining the sequence length.

More concretely, a case where K=2, I=2 and the resource block number is 44 (the sub-carrier number N=528) will be explained. As sequences satisfying the condition that K is not larger than 2 and the number of sequence length is not smaller than N, three sequence lengths, $528(=11\times3\times2^4)$ with the number of prime factors I=3, $529(=23\times23)$ with the number of prime factors I=2, $530(=53\times5\times2)$ with the number of prime factors I=3, are selected (step S50). Among these, the sequence length number having the number of prime factors 1 equal to or fewer than 2 and including a largest of greatest prime factors is 529, thus this sequence length is selected (step S51). As a result, the difference between the sub-carrier number N (528) and the sequence length (529) is 1. If a sequence having a length of a prime number is selected as in the conventional example, the sequence length will be 523 or 541 (refer to the row for RESOURCE BLOCK No. 44 in FIG. 12). Therefore, the difference between the sub-carrier number N and the sequence length is significantly reduced to 1 from 4.

FIG. 12 is a table showing the results obtained by applying the CAZAC sequence selection method according to the fourth mode of the present invention to the resource block numbers 1 to 50 in LTE. As shown in FIG. 12, in addition to the case where sub-carrier number N=528, the effect of the present mode is notable in the underlined resource block numbers.

As evident from FIG. 12, when the difference between the closest prime number and the sub-carrier number N is smaller than K, the same results as one of the conventional methods are obtained. For instance, when the resource block number is 1 (the sub-carrier number N=12), 13 or 11, the closet prime number(s) to N, is selected as the sequence length. In this case, the sequence may be allocated according to the truncation method.

On the other hand, in the underlined cases where the resource block numbers are not smaller than 10, it can be confirmed that the differences between the sub-carrier numbers N and the sequence lengths are significantly reduced, compared with the conventional methods. In this example, it may be controlled so that the present mode is applied only to the cases where the difference between the sub-carrier number N and the prime number closest to N is equal to or larger than 2, or only to the cases with the underlined resource block numbers.

As described above, when the number of the sequence length is equal to or larger than the sub-carrier number N, by selecting a CAZAC sequence based on Scheme A described above while taking the number of prime factors into consideration, many reference signal sequences having excellent properties can be obtained.

7. Mode 5

Figure 13:
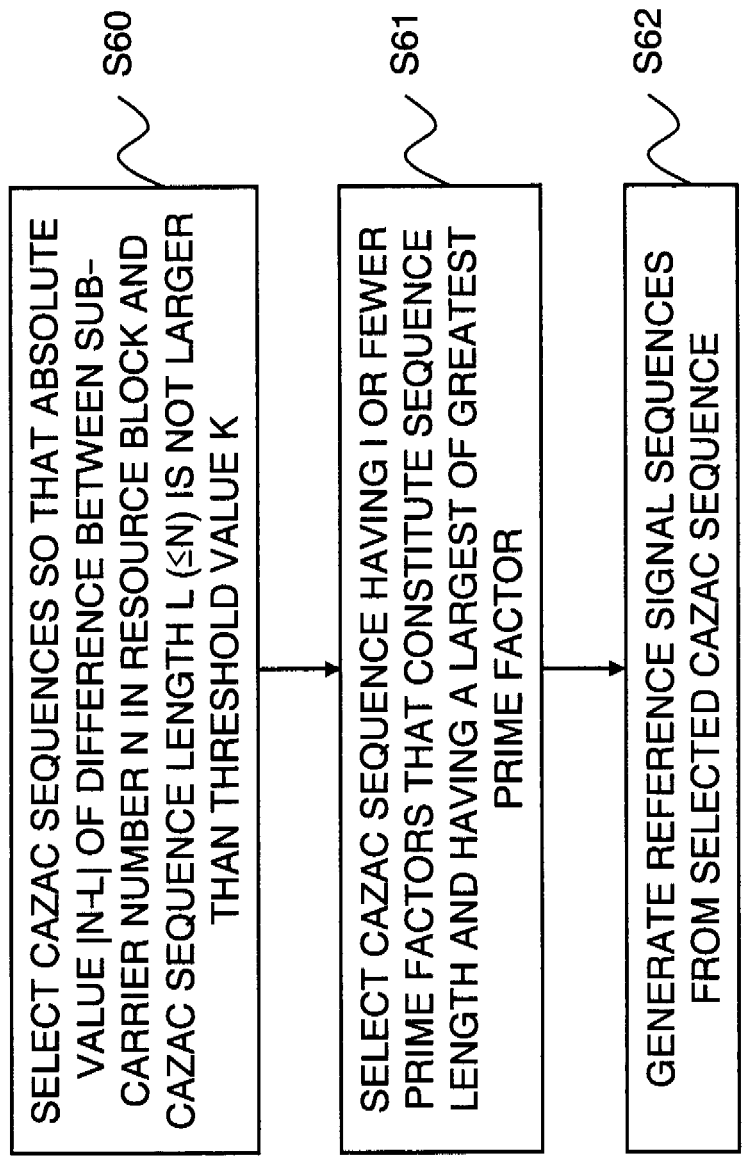
FIG. 13 is a flowchart showing a method for generating a reference signal according to a fifth mode of the present invention.

FIG. 13 is a flowchart showing a method for generating a reference signal according to a fifth mode of the present invention. In the present mode, when the number of the sequence length is not larger than the sub-carrier number N, CAZAC sequences are selected based on Scheme A described above while taking the number of prime factors into consideration.

First, CAZAC sequences satisfying a condition that an absolute value |N−L| of a difference between the sub-carrier number N in the resource block and the CAZAC sequence length L (not larger than N) is not larger than the threshold value K are selected (step S60). Next, a (at least one) CAZAC sequence having I or fewer prime factors that constitute the sequence length and having a largest of greatest prime factors is selected from the selected CAZAC sequences (step S61). Reference signal sequences are generated from the so selected CAZAC sequence according to the cyclic copy method described in FIG. 3C (step S62).

Note that, when there are a plurality of sequences satisfying the condition in the step S61, a predetermined criterion may be used to determine the sequence length (e.g., it may be based on the priority: the number of sequences or the property deterioration). For instance, when it is more important to obtain as many CAZAC sequences as possible, the longer sequence should be selected, whereas when it is more important to avoid the property deterioration caused by truncation, the shorter sequence should be selected, respectively for uniquely determining the sequence length.

More concretely, the case where K=2, I=2 and the resource block number is 27 (the sub-carrier number N=324) will be explained. As sequences satisfying the condition that K is not larger than 2 and the number of sequence length is not larger than N, the following three sequences, 322(=23×7×2) with the number of prime factors I=3, 323(=19×17) with the number of prime factors I=2, and 324(=$3^4 \times 2^2$) with the number of prime factors I=2, are selected (step S60). Among these, the sequence length number having a number of prime factors I equal to or fewer than 2 and including a largest of greatest prime factors is 323, thus this sequence length is selected (step S61). As a result, the difference between the sub-carrier number N and the sequence length is 1. If a sequence having a length of a prime number is selected as in the conventional example, the sequence length will be 317 or 331. Therefore, the difference between the sub-carrier number N and the sequence length is significantly reduced to 1 from 7 (refer to the line of RESOURCE BLOCK NUMBER 27, FIG. 14).

FIG. 14 is a table showing the results obtained by applying the CAZAC sequence selection method according to the fifth mode of the present invention to the resource block numbers 1 to 50 in LTE. As shown in FIG. 14, in addition to the case where sub-carrier number N=324, the effect of the present mode is notable in the underlined resource block numbers.

As evident from FIG. 14, when the difference between the closest prime number and the sub-carrier number N is smaller than K, the same results as one of the conventional methods are obtained. For instance, when the resource block number is 1 (the sub-carrier number N=12), 13 or 11, the closet prime numbers to N, is selected as the sequence length. In this case, the sequence may be allocated according to the cyclic copy method.

On the other hand, in the underlined cases where the resource block numbers are not smaller than 10, it can be confirmed that the differences between the sub-carrier numbers N and the sequence lengths are significantly reduced, compared with the conventional methods. In this example, it may be controlled so that the present mode is applied only to the cases where the difference between the sub-carrier number N and the prime number closest to N is equal to or larger than 2 or only to the cases with the underlined resource block numbers.

As described above, when the number of the sequence length is not larger than the sub-carrier number N, by selecting a CAZAC sequence based on Scheme A described above while taking the number of prime factors into consideration, many reference signal sequences having excellent properties can be obtained.

Example 1

8. Wireless Communication System

Figure 15:
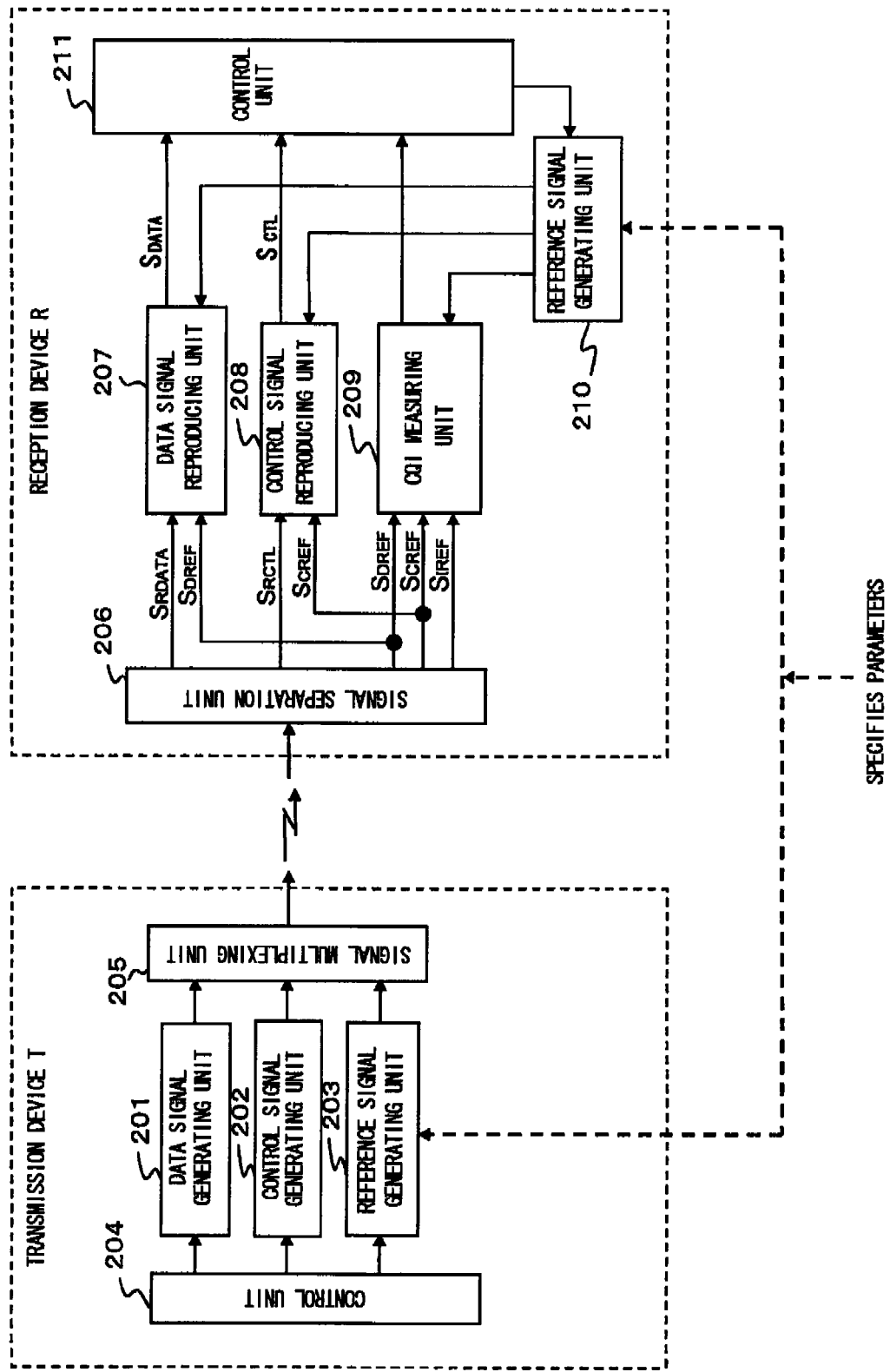
FIG. 15 is a schematic block diagram of a wireless communication system according to a first example of the present invention.

FIG. 15 is a schematic block diagram of a wireless communication system according to a first example of the present invention. Here, in order to simplify the explanation, only main parts relating to the present invention in a transmission device T and a reception device R are shown in the drawing.

In order to perform channel estimation using the reference signal, the sequence of the reference signal transmitted between the transmission device T and the reception device R has to be known. In the wireless communication system shown in FIG. 15, reference signal generating units 203 and 210 according to the present example are respectively provided in the transmission device T and the reception device R.

Further, the reference signal generating units 203 and 210 have the basic configuration shown in FIG. 4, generate CAZAC sequences using the equations (1) and (2) aforementioned according to specified parameters (the sequence length L and the sequence number k) and cyclic shifts, and generate reference signal sequences according to a predetermined sub-carrier allocation method. The parameters given to the reference signal generating units 203 and 210 generate the same CAZAC sequences for the transmission and reception devices so that the communication from the transmission device T to the reception device R can be executed. The parameters may be determined by the transmission device T or the reception device R and notified to the other, or they may be notified to the transmission device T and the reception device R by another control device within the network.

In the transmission device T, a data signal generating unit 201, a control signal generating unit 202, and the reference signal generating unit 203 are provided, and a control unit 204 controls these units. A data signal, a control signal, and a reference signal respectively outputted from the data signal generating unit 201, the control signal generating unit 202, and the reference signal generating unit 203 are time-multiplexed or/and frequency-multiplexed, and transmitted by a signal multiplexing unit 205.

The reception device R comprises a signal separation unit 206, a data signal reproducing unit 207, a control signal reproducing unit 208, a CQI measuring unit 209, the reference signal generating unit 210, and a control unit 211. Controlled by the control unit 211, the reference signal generating unit 210 supplies reference signals for the data signal, control signal, and CQI measurement to the data signal reproducing unit 207, the control signal reproducing unit 208, and the CQI measuring unit 209, respectively.

The signal separation unit 206 separates a data signal $S_{RDATA}$, a control signal $S_{RCTL}$, and three kinds of reference signals (a received data demodulation/detection reference signal $S_{DREF}$, a received control signal demodulation/detection reference signal $S_{CREF}$, and a CQI reference signal $S_{IREF}$) from a received signal in the time domain and frequency domain.

The data signal reproducing unit 207 receives the received data signal $S_{RDATA}$, its demodulation/detection reference signal $S_{DREF}$, and the data reference signal, demodulates/detects reception data $S_{DATA}$, and outputs it to the control unit 211. The control signal reproducing unit 208 receives the received control signal $S_{RCTL}$, its demodulation/detection reference signal $S_{CREF}$, and the reference signal for the control signal, demodulates/detects a control signal $S_{CTL}$, and outputs it to the control unit 211. The CQI measuring unit 209 receives the reception data demodulation/detection reference signal $S_{DREF}$, the reception control signal demodulation/detection reference signal $S_{CREF}$, the independent CQI reference signal $S_{IREF}$, and the reference signal for CQI measurement, measures the channel quality, and outputs the result to the control unit 211.

As mentioned above, since the reference signal generating units 203 and 210 are capable of obtaining many reference signal sequences having excellent properties, the reliability of the wireless communication can be improved and it becomes easier to avoid interference among wireless devices.

Example 2

Figure 16:
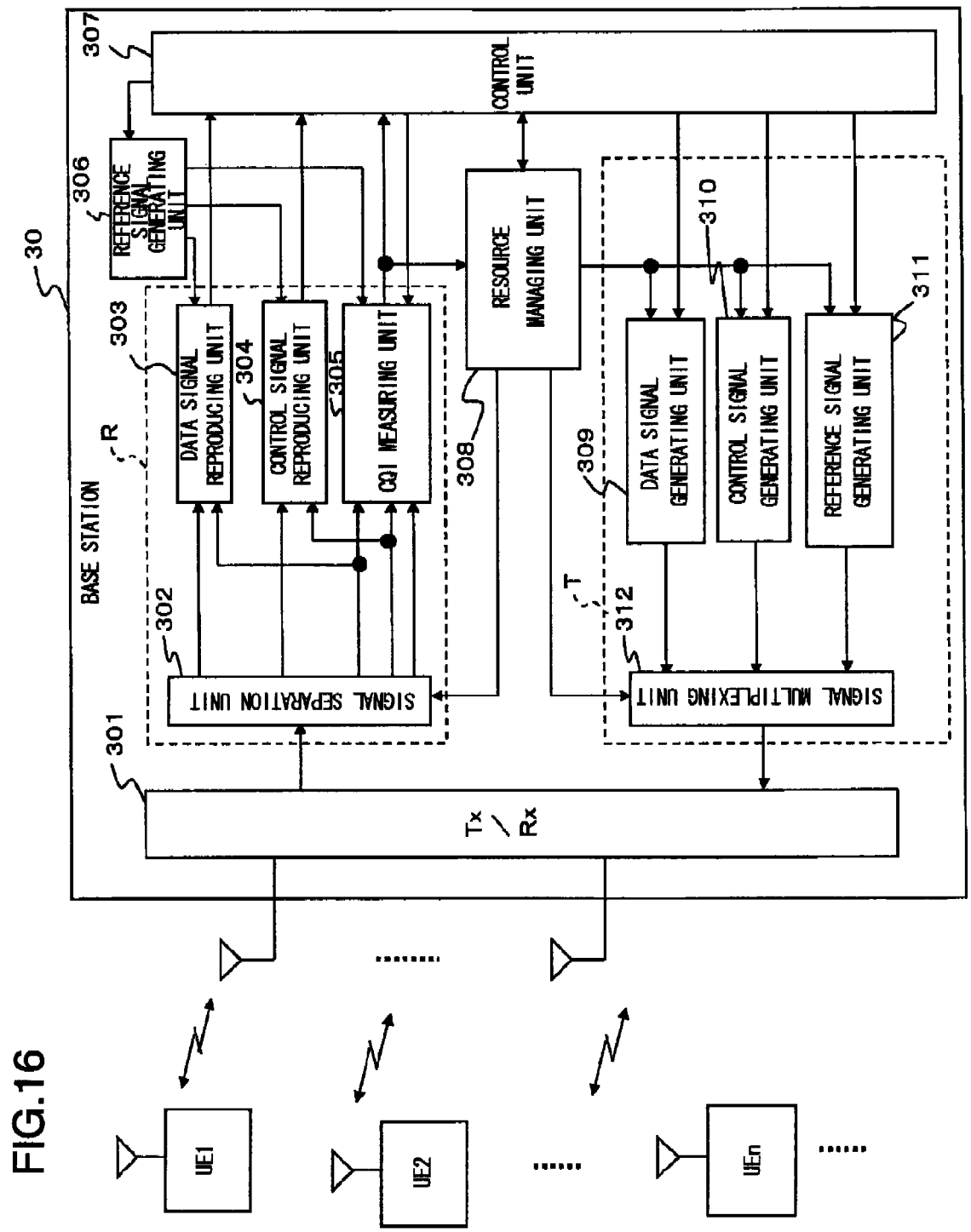
FIG. 16 is a block diagram showing the main structure of a base station in a wireless communication system according to a second example of the present invention.

FIG. 16 is a block diagram showing the main structure of a base station in a wireless communication system according to a second example of the present invention. Here, the base station 30 accommodates a plurality of user equipments (mobile terminals) UE1, UE2 . . . . The base station 30 relating to the present example is mainly constituted by a wireless transmission/reception unit (Tx/Rx) 301, a reception processing unit R, a reference signal generating unit 306, a control unit 307, a resource managing unit 308, and a transmission processing unit T.

Figure 1B:
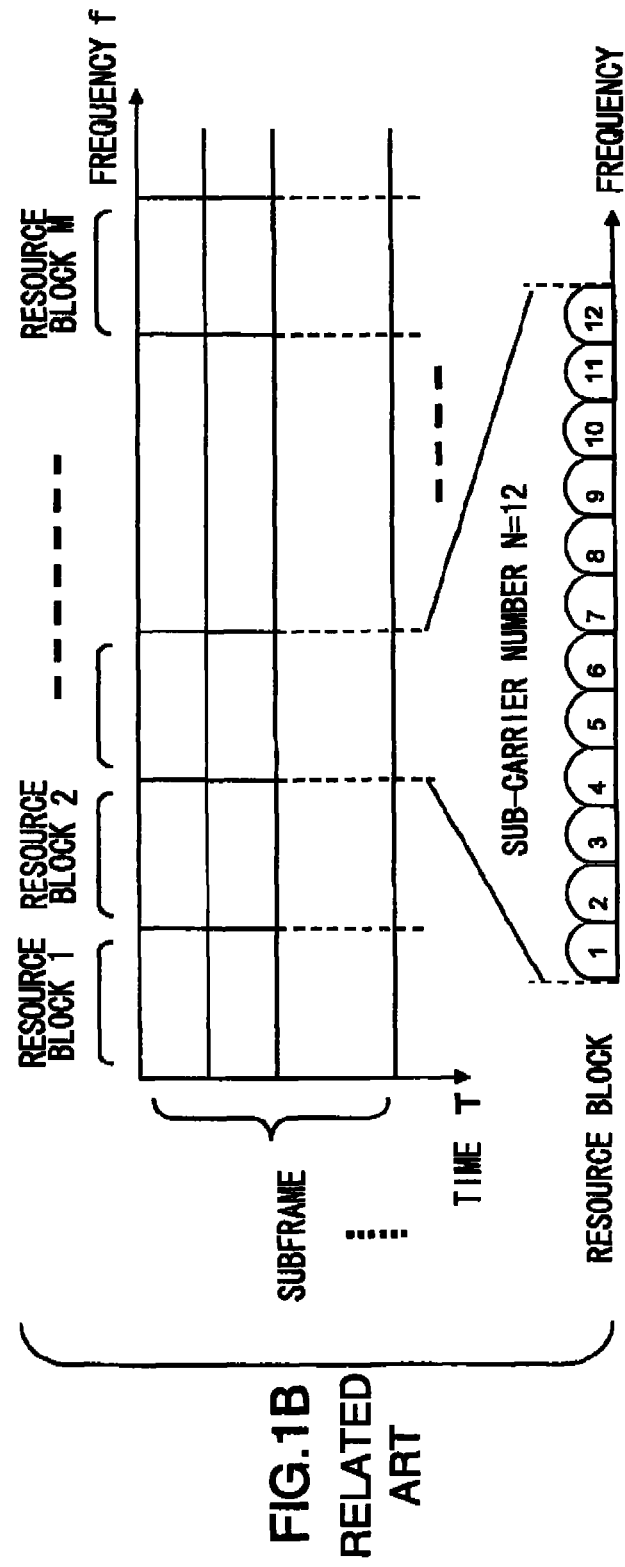
FIG. 1B is a format diagram showing an example of a frame structure of a signal transmitted/received between a base station and a user equipment (mobile terminal).

The wireless transmission/reception unit (Tx/Rx) 301 transmits/receives a wireless signal to/from a plurality of the user equipments UE through each channel having the frequency/time multiplex structure shown in FIG. 1B, for instance. The wireless transmission/reception unit 301 outputs a multiplexed received signal from a plurality of the user equipments UE to the reception processing unit R, converts a multiplexed transmission signal from the transmission processing unit T into a wireless signal, and transmits it.

The reception processing unit R comprises a signal separation unit 302, a data signal reproducing unit 303, a control signal reproducing unit 304, and a CQI measuring unit 305. These units respectively receive the reference signals for the data signal, the control signal, and CQI measurement from the reference signal generating unit 306. The configuration and operation of the reception processing unit R and the reference signal generating unit 306 are the same as those of the reception unit R in FIG. 15 described above.

The CQI measuring unit 305 measures the uplink channel quality of each user equipment UE using the reference signal sequences for CQI measurement, and outputs the results to the control unit 307 and the resource managing unit 308.

By receiving the results of the uplink channel quality measurement and comparing them, the resource managing unit 308 generates uplink resource allocation information indicating which resource blocks are allocated to each user equipment in terms of the data signal, the control signal and the reference signal. As described above, the signal separation unit 302 performs signal separation according to the uplink resource allocation information.

The transmission processing unit T includes a data signal generating unit 309, a control signal generating unit 310, a reference signal generating unit 311, and a signal multiplexing unit 312.

The data signal generating unit 309 generates a downlink data signal for a user equipment UE to which the downlink data should be transmitted according to downlink resource allocation information received from the resource managing unit 308, and output it to the signal multiplexing unit 312. The control signal generating unit 310 generates a downlink control signal for a user equipment UE to which the downlink control signal should be transmitted according to the downlink resource allocation information received from the resource managing unit 308, and output it to the signal multiplexing unit 312. The reference signal generating unit 311 generates a reference signal according to the downlink resource allocation information received from the resource managing unit 308, and outputs it to the signal multiplexing unit 312. As described above, according to the downlink resource allocation information, the reference signal generating unit 311 generates the demodulation/detection reference signal for user equipments UE having the downlink data signal or the downlink control signal and generates the reference signal for CQI measurement for user equipments UE entering in channel-dependent scheduling. The resource managing unit 308 receives the results of downlink channel quality measurement by each user equipment and generates the downlink resource allocation information.

The signal multiplexing unit 312 generates a transmission signal by frequency-multiplexing and/or time-multiplexing the downlink data signal, the downlink control signal, and the reference signal generated for each user equipment UE according to the downlink resource allocation information, and transmits it from the wireless transmission/reception unit 301.

Further, the uplink resource allocation information and the downlink resource allocation information generated by the resource managing unit 308 are transmitted with the control signal to each user equipment UE by the control signal generating unit 310 according to the control of the control unit 307. Each user equipment UE determines the resource blocks that it uses for uplink and downlink communication between itself and the base station 30 according to the received uplink and downlink resource allocation information.

In the present example, the parameters for generating the reference signal sequences are determined by the control unit 307 of the base station 30. After determining the parameters for generating the reference signal sequences used in the communication with each user equipment UE, the control unit 307 has the control signal generating unit 310 transmit the control signal including the parameters to each user equipment. This parameter notification can be performed using a shared channel. Then, each user equipment UE generates the reference signal according to the parameters notified and transmits it along with the data/control signal to the base station 30. Corresponding to each user equipment UE, the reference signal generating unit 306 generates the reference signal(s) according to the same parameters, therefore the demodulation/detection and channel quality estimation of the uplink signal from each user equipment UE becomes possible in the base station 30.

The control unit 307 executes the operation control of the entire base station, however, the same function may also be implemented by a control program executed on a program control processor. Further, the reference signal generating units 306 and 311 may be implemented by a reference signal generating program according to each mode of the present invention described above executed on a program control processor.

As mentioned above, since the reference signal generating units 306 and 311 are capable of obtaining many reference signal sequences having excellent properties, the reliability of the wireless communication can be improved and it becomes easier to avoid interference among base stations (i.e., among the transmissions from/to a plurality of base stations).

Example 3

Figure 17:
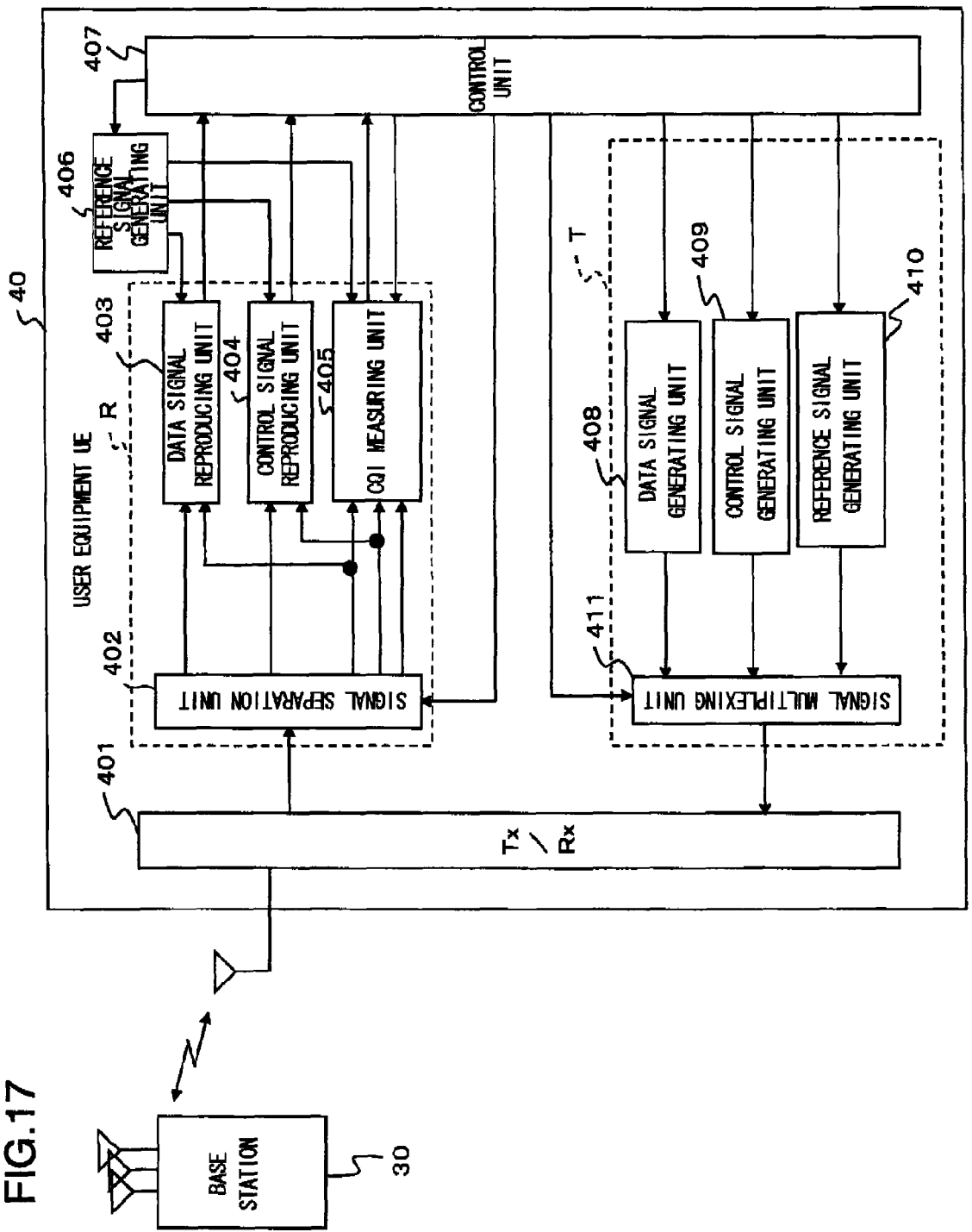
FIG. 17 is a block diagram showing the main structure of a user equipment in a wireless communication system according to a third example of the present invention.

FIG. 17 is a block diagram showing the main structure of a user equipment (mobile terminal of cell phone) in a wireless communication system according to a third example of the present invention. Since the user equipment 40 does not perform resource management, the resources used in transmission/reception are set according to the uplink and downlink resource allocation information received from the base station 30. Further, the user equipment 40 enables the communication with the base station by using the parameters for generating the reference signal notified from the base station 30 to set reference signal generating units 406 and 410. The configuration of the user equipment will be briefly described.

In FIG. 17, the user equipment 40 relating to the present example comprises, as main components, a wireless transmission/reception unit (Tx/Rx) 401, a reception processing unit R, a reference signal generating unit 406, a control unit 407, and a transmission processing unit T. The wireless transmission/reception unit (Tx/Rx) 401 transmits/receives a wireless signal to/from the base station 30 through a specified channel.

The reception processing unit R comprises a signal separation unit 402, a data signal reproducing unit 403, a control signal reproducing unit 404, and a CQI measuring unit 405. These units respectively receive the reference signals for the data signal, the control signal, and CQI measurement from the reference signal generating unit 406. The configuration and operation of the reception processing unit R and the reference signal generating unit 406 are the same as those of the reception unit R in FIG. 15 described above.

It should noted that the parameters for generating the reference signal received from the base station 30 are reproduced by the control signal reproducing unit 404, and the reference signal generating units 406 and 410 are set by the control unit 407 using these parameters.

The transmission processing unit T includes a data signal generating unit 408, a control signal generating unit 409, a reference signal generating unit 410, and a signal multiplexing unit 411. When an uplink data signal is transmitted, the data signal generating unit 408 generates the uplink data signal according to the uplink resource allocation information received from the control unit 407 and outputs it to the signal multiplexing unit 411. When an uplink control signal is transmitted, the control signal generating unit 409 generates the uplink control signal according to the uplink resource allocation information and outputs it to the signal multiplexing unit 411. The reference signal generating unit 410 generates the reference signal according to the uplink resource allocation information and the parameters notified by the base station 30 and outputs it to the signal multiplexing unit 411. As described above, the reference signal generating unit 410 generates the demodulation/detection reference signal when there is the uplink data signal or the uplink control signal; whereas it generates the reference signal for CQI estimation when the user equipment is under entry in channel-dependent scheduling; respectively, according to the uplink resource allocation information and the parameters.

The signal multiplexing unit 411 generates a transmission signal by multiplexing the uplink data signal, the uplink control signal, and/or the reference signal generated as described with the resource blocks specified by the uplink resource allocation information, and transmits it to the base station 30 from the wireless transmission/reception unit 401.

As mentioned above, since the reference signal generating units 406 and 410 in the present example are capable of obtaining many reference signal sequences having excellent properties, the reliability of the wireless communication can be improved and it becomes easier to avoid interference among user equipments (mobile terminals).

The present invention can be applied to reference signal generation in a wireless communication system, and particularly to wireless apparatuses and mobile communication systems such as a base station or user equipment in which reference signals are generated from CAZAC sequences.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method for generating a reference signal, in which the reference signal is generated using at least one CAZAC (Constant Amplitude Zero Auto-Correlation) sequence to at least one resource block, comprising:

selecting at least one first CAZAC sequence length that satisfies a condition that an absolute value of a difference between a predetermined sub-carrier number in said at least one resource block and a CAZAC sequence length number is not larger than a predetermined threshold value;

selecting at least one second CAZAC sequence length having a largest among greatest prime factors constituting each sequence length from said at least one first CAZAC sequence length; and generating the reference signal from said at least one CAZAC sequence of a selected one of said at least one second CAZAC sequence length.

2. The method for generating a reference signal as defined in claim 1 wherein said first CAZAC sequence length is selected so that the absolute value of the difference between said predetermined sub-carrier number and the CAZAC sequence length number is the least.

3. The method for generating a reference signal as defined in claim 1 wherein a CAZAC sequence length having a number of prime factors not larger than a second predetermined value and having the largest among greatest prime factors is selected as said at least one second CAZAC sequence length from said at least one first CAZAC sequence length satisfying the condition that the absolute value of the difference between said predetermined sub-carrier number and the CAZAC sequence length number is not larger than the predetermined threshold value.

4. The method for generating a reference signal as defined in claim 1 wherein a longest sequence length is selected when there are a plurality of said at least one second CAZAC sequence lengths.

5. The method for generating a reference signal as defined in claim 1 wherein a shortest sequence length is selected when there are a plurality of said at least one second CAZAC sequence lengths.

6. An apparatus for generating a reference signal, which generates the reference signal using CAZAC (Constant Amplitude Zero Auto-Correlation) sequences, comprising:

CAZAC sequence selecting means for selecting a CAZAC sequence length having a largest among greatest prime factors constituting each sequence length from at least one CAZAC sequence length that satisfy a condition that an absolute value of a difference between a predetermined sub-carrier number and a CAZAC sequence length number is not larger than a predetermined threshold value; and reference signal generating means for generating said reference signal from a CAZAC sequence of said selected CAZAC sequence length.

7. The apparatus for generating a reference signal as defined in claim 6 wherein said CAZAC sequence selecting means selects said CAZAC sequence length so that the absolute value of the difference between said predetermined sub-carrier number and the CAZAC sequence length number is the least.

8. The apparatus for generating a reference signal as defined in claim 6 wherein said CAZAC sequence selecting means selects a CAZAC sequence length having a number of prime factors not larger than a second predetermined value and having the largest among greatest prime factors as said CAZAC sequence length from said at least one CAZAC sequence length satisfying the condition that the absolute value of the difference between said predetermined sub-carrier number and the CAZAC sequence length number is not larger than the predetermined threshold value.

9. A wireless communication apparatus in a wireless communication system that performs wireless communication by multiplexing a transmission signal with a reference signal, comprising:

reference signal generating means for generating the reference signal by allocating at least one reference signal sequence generated from at least one CAZAC (Constant Amplitude Zero Auto-Correlation) sequence to at least one resource block; and communicating means for communicating with other wireless apparatuses using said reference signal; wherein said reference signal generating means includes:

CAZAC sequence selecting means for selecting a CAZAC sequence length having a largest among greatest prime factors constituting each sequence length from at least one CAZAC sequence length that satisfy a condition that an absolute value of a difference between a predetermined sub-carrier number and a number of the at least one CAZAC sequence length is not larger than a predetermined threshold value; and reference signal sequence generating means for generating said reference signal sequence from a CAZAC sequence of said selected CAZAC sequence length.

10. A wireless communication system that performs wireless communication by multiplexing at least one of a transmission reference signal and a reception reference signal between a transmission device and a reception device, wherein said transmission device comprises:

transmission reference signal generating means for generating the transmission reference signal by allocating at least one transmission reference signal sequence generated from at least one CAZAC (Constant Amplitude Zero Auto-Correlation) sequence to at least one resource block; and transmitting means for multiplexing a transmission signal and said transmission reference signal and transmitting said transmission signal and said transmission reference signal to the reception device;

said reception device comprises:

reception reference signal generating means for generating the reception reference signal by allocating at least one reception reference signal sequence generated from another at least one CAZAC sequence to said at least one resource block; and receiving means for receiving said transmission signal and said transmission reference signal from said transmission device using said reception reference signal;

said transmission reference signal generating means comprising:

transmission CAZAC sequence selecting means for selecting a transmission CAZAC sequence length having a largest among greatest prime factors constituting each sequence length from at least one CAZAC sequence length that satisfy a condition that an absolute value of a difference between a predetermined sub-carrier number in said at least one resource block and a number of the at least one CAZAC sequence length is not larger than a predetermined threshold value; and transmission reference signal sequence generating means for generating said transmission reference signal sequence from a CAZAC sequence of said selected transmission CAZAC sequence length;

said reception reference signal generating means comprising:

reception CAZAC sequence selecting means for selecting a reception CAZAC sequence length having a largest among greatest prime factors constituting each sequence length from the at least one CAZAC sequence length that satisfy the condition that the absolute value of the difference between the predetermined sub-carrier number in said at least one resource block and the CAZAC length number is not larger than the predetermined threshold value; and reception reference signal sequence generating means for generating said reception reference signal sequence from a CAZAC sequence of said selected reception CAZAC sequence length; and at least one of said transmission and reception reference signal generating means is preset so that said transmission CAZAC sequence and said reception CAZAC sequence are identical.

11. The wireless communication system as defined in claim 10 wherein said transmission device notifies information for generating said transmission CAZAC sequence to said reception device, and said reception reference signal generating means generates said reception CAZAC sequence according to said information.

12. The wireless communication system as defined in claim 10 wherein said reception device notifies information for generating said reception CAZAC sequence to said transmission device, and said transmission reference signal generating means generates said transmission CAZAC sequence according to said information.

13. A mobile communication system that performs wireless communication by multiplexing a reference signal between a plurality of user equipments and a base station, wherein said base station and each of said plurality of user equipments comprise:

reference signal generating means for generating the reference signal by allocating at least one reference signal sequence generated from at least one CAZAC (Constant Amplitude Zero Auto-Correlation) sequence to at least one resource block; and communicating means for communicating using said reference signal;

said reference signal generating means comprises:
CAZAC sequence selecting means for selecting a CAZAC sequence length having a largest among greatest prime factors constituting each sequence length from at least one CAZAC sequence length that satisfy a condition that an absolute value of a difference between a predetermined sub-carrier number in said at least one resource block and a number of the at least one CAZAC sequence length is not larger than a predetermined threshold value; and reference signal sequence generating means for generating said reference signal sequence from said at least one CAZAC sequence of said selected CAZAC sequence length; and identical reference signal sequences are used between said base station and each user equipment by having said base station specify said at least one resource block and said at least one CAZAC sequence, for each user equipment, used for the communication with the user equipment.

14. A base station in a mobile communication system that performs wireless communication by multiplexing a reference signal, comprising:

reference signal generating means for generating the reference signal by allocating at least one reference signal sequence generated from at least one CAZAC (Constant Amplitude Zero Auto-Correlation) sequence to at least one resource block; and communicating means for communicating with each user equipment using said reference signal; wherein said reference signal generating means includes:

CAZAC sequence selecting means for selecting a CAZAC sequence length having a largest among greatest prime factors constituting each sequence length from at least one CAZAC sequence length that satisfy a condition that an absolute value of a difference between a predetermined sub-carrier number in said at least one resource block and a number of the at least one CAZAC sequence length is not larger than a predetermined threshold value; and reference signal sequence generating means for generating said reference signal sequence from a CAZAC sequence of said selected CAZAC sequence length.

15. A user equipment in a mobile communication system that performs wireless communication by multiplexing a reference signal, comprising:

reference signal generating means for generating the reference signal by allocating at least one reference signal sequence generated from at least one CAZAC (Constant Amplitude Zero Auto-Correlation) sequence to at least one resource block; and communicating means for communicating with a base station using said reference signal; wherein said reference signal generating means includes:

CAZAC sequence selecting means for selecting a CAZAC sequence length having a largest among greatest prime factors constituting each sequence length from at least one CAZAC sequence length that satisfy a condition that an absolute value of a difference between a predetermined sub-carrier number in said at least one resource block and a number of the at least one CAZAC sequence length is not larger than a predetermined threshold value; and reference signal sequence generating means for generating said reference signal sequence from a CAZAC sequence of said selected CAZAC sequence length.

16. A non-transitory computer-readable storage medium that stores a program, in an apparatus that generates a reference signal by allocating at least one CAZAC (Constant Amplitude Zero Auto-Correlation) sequence to at least one resource block, having a computer execute:

selecting at least one first CAZAC sequence length that satisfies a condition that an absolute value of a difference between a predetermined sub-carrier number in said at least one resource block and a CAZAC sequence length number is not larger than a predetermined threshold value;

selecting at least one second CAZAC sequence length having a largest among greatest prime factors constituting each sequence length from said at least one first CAZAC sequence length; and generating the reference signal from said at least one CAZAC sequence of a selected one of said at least one second CAZAC sequence length.

\* \* \* \* \*